US011764357B2

(12) United States Patent
Nelson et al.

(10) Patent No.: US 11,764,357 B2
(45) Date of Patent: *Sep. 19, 2023

(54) BATTERY INCLUDING BETA-DELITHIATED LAYERED NICKEL OXIDE ELECTROCHEMICALLY ACTIVE CATHODE MATERIAL

(71) Applicant: DURACELL U.S. OPERATIONS, INC., Wilmington, DE (US)

(72) Inventors: Jennifer A. Nelson, Waltham, MA (US); Paul Albert Christian, Norton, MA (US); Stephen A. Hackney, Houghton, MI (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/248,650

(22) Filed: Feb. 1, 2021

(65) Prior Publication Data
US 2021/0167383 A1 Jun. 3, 2021

Related U.S. Application Data

(63) Continuation of application No. 15/973,653, filed on May 8, 2018, now Pat. No. 10,910,647.

(Continued)

(51) Int. Cl.
*H01M 4/525* (2010.01)
*H01M 4/36* (2006.01)
(Continued)

(52) U.S. Cl.
CPC ............ *H01M 4/525* (2013.01); *C01G 53/04* (2013.01); *C01G 53/42* (2013.01); *C01G 53/66* (2013.01);
(Continued)

(58) Field of Classification Search
CPC .......... H01M 4/545; H01M 4/32; H01M 4/36; H01M 6/04; C01G 53/00; C01G 53/04
See application file for complete search history.

(56) References Cited

U.S. PATENT DOCUMENTS 2,956,860 A    10/1960  Welsch et al.
3,437,435 A     4/1969  Moore et al.
(Continued)

FOREIGN PATENT DOCUMENTS

CA    1263697 A    12/1989
EP    0702421 A1    3/1996
(Continued)

OTHER PUBLICATIONS

European Patent Application No. 21159405.6, Extended European Search Report, dated May 20, 2021.
(Continued)

*Primary Examiner* — Kenneth J Douyette
(74) *Attorney, Agent, or Firm* — MARSHALL, GERSTEIN & BORUN LLP

(57) ABSTRACT

The invention is directed towards an electrochemically active cathode material for a battery. The electrochemically active cathode material includes a non-stoichiometric beta-delithiated layered nickel oxide. The non-stoichiometric beta-delithiated layered nickel oxide has a chemical formula. The chemical formula is $Li_xA_yNi_{1+a-z}M_zO_2 \cdot nH_2O$ where x is from about 0.02 to about 0.20; y is from about 0.03 to about 0.20; a is from about 0.02 to about 0.2; z is from about 0 to about 0.2; and n is from about 0 to about 1. Within the chemical formula, A is an alkali metal. The alkali metal includes potassium, rubidium, cesium, and any combination thereof. Within the chemical formula, M comprises an alkaline earth metal, a transition metal, a non-transition metal, and any combination thereof.

25 Claims, 6 Drawing Sheets

Related U.S. Application Data

(60) Provisional application No. 62/503,829, filed on May 9, 2017.

(51) Int. Cl.

| | | |
|---|---|---|
| *H01M 4/32* | (2006.01) | |
| *H01M 6/04* | (2006.01) | |
| *C01G 53/00* | (2006.01) | |
| *C01G 53/04* | (2006.01) | |
| *H01M 4/50* | (2010.01) | |
| *H01M 4/24* | (2006.01) | |
| *H01M 50/40* | (2021.01) | |
| *H01M 4/02* | (2006.01) | |

(52) U.S. Cl.
CPC ............ *H01M 4/244* (2013.01); *H01M 4/32* (2013.01); *H01M 4/364* (2013.01); *H01M 4/50* (2013.01); *H01M 6/04* (2013.01); *H01M 50/40* (2021.01); *C01P 2002/22* (2013.01); *C01P 2002/72* (2013.01); *C01P 2002/76* (2013.01); *C01P 2002/77* (2013.01); *C01P 2002/78* (2013.01); *C01P 2004/03* (2013.01); *C01P 2006/40* (2013.01); *H01M 2004/028* (2013.01); *H01M 2300/0014* (2013.01)

(56) References Cited

U.S. PATENT DOCUMENTS

| | | | |
|---|---|---|---|
| 3,520,729 | A | 7/1970 | Voss et al. |
| 4,136,236 | A | 1/1979 | Ruetschi |
| 4,192,914 | A | 3/1980 | Ruetschi |
| 4,246,253 | A | 1/1981 | Hunter |
| 4,312,930 | A | 1/1982 | Hunter |
| 4,383,029 | A | 5/1983 | Yamada et al. |
| 4,451,543 | A | 5/1984 | Dzieciuch et al. |
| 4,777,100 | A | 10/1988 | Chalilpoyil et al. |
| 4,959,282 | A | 9/1990 | Dahn et al. |
| 5,277,890 | A | 1/1994 | Wang et al. |
| 5,283,139 | A | 2/1994 | Newman et al. |
| 5,348,726 | A | 9/1994 | Wang et al. |
| 5,391,365 | A | 2/1995 | Wang et al. |
| 5,425,932 | A | 6/1995 | Tarascon |
| 5,482,796 | A | 1/1996 | Wang et al. |
| 5,532,084 | A | 7/1996 | Wang et al. |
| 5,587,133 | A | 12/1996 | Amatucci et al. |
| 5,626,988 | A | 5/1997 | Daniel-Ivad et al. |
| 5,720,932 | A | 2/1998 | Amine et al. |
| 5,759,510 | A | 6/1998 | Pillai |
| 5,772,890 | A | 6/1998 | Hubred |
| 5,783,334 | A | 7/1998 | Yasuda |
| 5,798,180 | A | 8/1998 | Chowdhury et al. |
| 5,910,366 | A | 6/1999 | Chowdhury et al. |
| 5,952,124 | A | 9/1999 | Kainthla et al. |
| 5,955,052 | A | 9/1999 | Padhi et al. |
| 6,054,234 | A | 4/2000 | Weiss et al. |
| 6,074,784 | A | 6/2000 | Maruta |
| 6,162,561 | A | 12/2000 | Wang et al. |
| 6,265,105 | B1 | 7/2001 | Tokuda et al. |
| 6,270,921 | B1 | 8/2001 | Kaplan et al. |
| 6,284,410 | B1 | 9/2001 | Durkot et al. |
| 6,334,993 | B1 | 1/2002 | Suita et al. |
| 6,335,119 | B1 | 1/2002 | Maruta |
| 6,428,766 | B1 | 8/2002 | Fujino et al. |
| 6,444,364 | B1 | 9/2002 | Harris et al. |
| 6,472,103 | B1 | 10/2002 | Durkot et al. |
| 6,492,062 | B1 | 12/2002 | Wang et al. |
| 6,509,117 | B1 | 1/2003 | Bowden et al. |
| 6,521,378 | B2 | 2/2003 | Durkot et al. |
| 6,566,009 | B1 | 5/2003 | Noya et al. |
| 6,589,693 | B1 | 7/2003 | Kilby et al. |
| 6,617,072 | B2 | 9/2003 | Venkatesan et al. |
| 6,620,550 | B2 | 9/2003 | Christian et al. |
| 6,667,131 | B1 | 12/2003 | Vitins et al. |
| 6,753,109 | B2 | 6/2004 | Nanjundaswamy et al. |
| 6,759,166 | B2 | 7/2004 | Wang et al. |
| 6,783,893 | B2 | 8/2004 | Bowden et al. |
| 6,794,082 | B2 | 9/2004 | Mori et al. |
| 6,818,347 | B1 | 11/2004 | Jin et al. |
| 6,858,349 | B1 | 2/2005 | Luo et al. |
| 6,932,846 | B2 | 8/2005 | Bowden et al. |
| 6,936,378 | B2 | 8/2005 | Randell |
| 6,991,875 | B2 | 1/2006 | Christian et al. |
| 7,045,247 | B1 | 5/2006 | Copeland et al. |
| 7,045,252 | B2 | 5/2006 | Christian et al. |
| 7,081,319 | B2 | 7/2006 | Christian et al. |
| 7,232,628 | B2 | 6/2007 | Randell |
| 7,247,407 | B2 | 7/2007 | Durkot et al. |
| 7,273,680 | B2 | 9/2007 | Durkot et al. |
| 7,314,681 | B2 | 1/2008 | Randell et al. |
| 7,407,521 | B2 | 8/2008 | Shimakawa et al. |
| 7,407,726 | B2 | 8/2008 | Wang et al. |
| 7,435,395 | B2 | 10/2008 | Durkot et al. |
| 7,569,306 | B2 | 8/2009 | Kato et al. |
| 7,763,383 | B2 | 7/2010 | Miyamoto et al. |
| 7,767,336 | B2 | 8/2010 | Ito et al. |
| 7,807,297 | B2 | 10/2010 | Anglin et al. |
| 8,003,254 | B2 | 8/2011 | Bofinger et al. |
| 8,133,615 | B2 | 3/2012 | Johnson |
| 8,303,840 | B2 | 11/2012 | Nanjundaswamy et al. |
| 8,318,350 | B2 | 11/2012 | Johnson |
| 8,691,439 | B2 | 4/2014 | Ndzebet et al. |
| 8,872,963 | B2 | 10/2014 | Omata et al. |
| 8,920,969 | B2 | 12/2014 | Issaev et al. |
| 9,793,542 | B2 | 10/2017 | Nelson et al. |
| 9,793,543 | B2 | 10/2017 | Anglin et al. |
| 10,158,118 | B2 | 12/2018 | Anglin et al. |
| 10,276,869 | B2 | 4/2019 | Nelson et al. |
| 2002/0172867 | A1 | 11/2002 | Anglin |
| 2003/0068549 | A1 | 4/2003 | Daniel-Ivad et al. |
| 2004/0009400 | A1 | 1/2004 | Yamaguchi et al. |
| 2005/0079424 | A1 | 4/2005 | Davis et al. |
| 2005/0152830 | A1 | 7/2005 | Yasutomi et al. |
| 2005/0164086 | A1 | 7/2005 | Bofinger et al. |
| 2005/0221181 | A1 | 10/2005 | Durkot et al. |
| 2007/0015054 | A1 | 1/2007 | Nunome et al. |
| 2007/0248879 | A1 | 10/2007 | Durkot et al. |
| 2008/0008937 | A1 | 1/2008 | Eylem et al. |
| 2008/0171266 | A1 | 7/2008 | Kato et al. |
| 2008/0193487 | A1 | 8/2008 | Schild et al. |
| 2008/0193847 | A1 | 8/2008 | Suetsugu et al. |
| 2008/0241683 | A1 | 10/2008 | Fensore et al. |
| 2008/0274405 | A1 | 11/2008 | Kobayashi et al. |
| 2009/0047578 | A1 | 2/2009 | Iwamoto et al. |
| 2009/0162745 | A1 | 6/2009 | Iwamoto et al. |
| 2009/0249614 | A1 | 10/2009 | Davis et al. |
| 2009/0258297 | A1 | 10/2009 | Davis et al. |
| 2010/0003596 | A1 | 1/2010 | Sato et al. |
| 2011/0151329 | A1 | 6/2011 | Bernard et al. |
| 2011/0219607 | A1 | 9/2011 | Nanjundaswamy et al. |
| 2011/0223477 | A1 | 9/2011 | Nelson et al. |
| 2011/0223493 | A1 | 9/2011 | Christian et al. |
| 2013/0065112 | A1 | 3/2013 | Uzuka et al. |
| 2013/0247363 | A1 | 9/2013 | Nelson et al. |
| 2013/0248758 | A1 | 9/2013 | Park et al. |
| 2014/0154542 | A1 | 6/2014 | Issaev et al. |
| 2014/0298645 | A1 | 10/2014 | Aouad |
| 2015/0280234 | A1 | 10/2015 | Nelson et al. |
| 2015/0280250 | A1 | 10/2015 | Anglin et al. |
| 2018/0040894 | A1 | 2/2018 | Nelson et al. |
| 2018/0040895 | A1 | 2/2018 | Anglin et al. |
| 2019/0123351 | A1 | 4/2019 | Anglin et al. |
| 2019/0252683 | A1 | 8/2019 | Nelson et al. |

FOREIGN PATENT DOCUMENTS

| | | |
|---|---|---|
| JP | H06511106 A | 12/1994 |
| JP | H08250121 A | 9/1996 |
| JP | H11139830 A | 5/1999 |
| JP | 2001332259 A | 11/2001 |
| JP | 2003151549 A | 5/2003 |
| JP | 2004323331 A | 11/2004 |
| JP | 2005322551 A | 11/2005 |

(56) References Cited

FOREIGN PATENT DOCUMENTS

| | | |
|---|---|---|
| JP | 2005332691 A | 12/2005 |
| JP | 2007026896 A | 2/2007 |
| WO | WO-93/06474 A1 | 4/1993 |
| WO | WO-2009/082862 A1 | 7/2009 |
| WO | WO-2010/023531 A2 | 3/2010 |
| WO | WO-2015/148245 A1 | 10/2015 |
| WO | WO-2015/192147 A2 | 12/2015 |
| WO | WO-2016/160659 A1 | 10/2016 |

OTHER PUBLICATIONS

Chinese Patent Application No. 201880030824.X, First Office Action, dated Dec. 3, 2021.
Abbas, et al. "Hydroxyl as a Defect of the Manganese Dioxide Lattice and its Applications to the Dry Cell Battery." *Journal of Power Sources* 58, No. 1 (1996): 15-21.
Alcantara, et al. "Structure and Electrochemical Properties of Li1-x (NiyCol-y)1 + × O2 Effect of Chemical Delithiation at 0°C." *Journal of the Electrochemical Society* 142, No. 12 (1995): 3997-4005.
Ammundsen, et al. "Effect of Chemical Extraction of Lithium on the Local Structure of Spinel Lithium Manganese Oxides Determined by X-ray Absorption Spectroscopy." *Chemistry of Materials* 8, No. 12 (1996): 2799-2808.
Ammundsen, et al. "Mechanism of Proton Insertion and Characterization of the Proton Sites in Lithium Manganate Spinels." *Chemistry of Materials* 7, No. 11 (1995): 2151-2160.
Arai et al., "Characterization and cathode performance of Li1—xNi1+xO2 prepared with the excess lithium method," *Solid State Ionics*, 80:261-269 (1995).
Arai, et al. "Characteristics of Lix NiO2 Obtained by Chemical Delithiation." *Journal of Power Sources* 81 (1999): 401-405.
Arai, et al. "Nickel Dioxide Polymorphs as Lithium Insertion Electrodes." *Electrochimica Acta* 47, No. 17 (2002): 2697-2705.
Arai, et al. "Structural and Thermal Characteristics of Nickel Dioxide Derived from LiNiO2." *Journal of Solid State Chemistry* 163, No. 1 (2002): 340-349.
Arai, et al. "Synthesis and Electrode Performance of Layered Nickel Dioxide Containing Alkaline Ions." *Electrochimica Acta* 50, No. 9 (2005): 1821-1828.
Arai, et al., "Lithium Nickelate With Cadmium Iodide Structure." *Materials Research Society Proceedings*, Library Archive 575 (2000): 3-7.
Ariza, et al. "Probing the Local Structure and the Role of Protons in Lithium Sorption Processes of a New Lithium-Rich Manganese Oxide." *Chemistry of Materials* 18, No. 7 (2006): 1885-1890.
Armstrong, et al. "Demonstrating Oxygen Loss and Associated Structural Reorganization in the Lithium Battery Cathode Li[Ni0.2Li0.2Mn0.6]O2." *Journal of the American Chemical Society* 128, No. 26 (2006): 8694-8698.
Arunkumar, et al. "Chemical and Structural Instability of the Chemically Delithiated (1-z) Li [Li1/3Mn2/3] O2 (z) Li [Co1-yNiy]O2 (0≤ y≤ 1 and 0 ≤ z≤ 1) Solid Solution Cathodes." *Journal of Materials Chemistry* 18, No. 2 (2008): 190-198.
Axmann, et al. "Nickel Hydroxide as a Matrix for Unusual Valencies: the Electrochemical Behaviour of Metal (III)-Ion-Substituted Nickel Hydroxides of the Pyroaurite Type." *Journal of Alloys and Compounds* 246, No. 1 (1997): 232-241 (abstract only).
Axmann, et al. "Formation of FeIV and NiIV by Electrochemical and Chemical Oxidation of an Iron-Substituted Nickel(II) Hydroxide: The Direct Two-Electron Step NiII →> NiIV + 2e-." *Angewandte Chemie International Edition in English* 35, No. 10 (1996): 1115-1118.
Benhaddad, et al. "Reactivity of Nanostructured MnO2 in Alkaline Medium Studied with a Micro-Cavity Electrode: Effect of Synthesizing Temperature." *ACS Applied Materials & Interfaces* 1, No. 2 (2009): 424-432.
Blesa, et al. "α-NaFeO2: Ionic Conductivity and Sodium Extraction." *Solid State Ionics* 126, No. 1 (1999): 81-87.

Blesa, et al. "A New Route to γ-Fe2 O3 via an Intermediate Oxyhydroxide. The Reaction of α-NaFeO2 with Benzoic Acid." *Journal of Materials Chemistry* 9, No. 1 (1999): 227-231.
Blesa, et al. "Nonstoichiometric Spinel Ferrites Obtained From α—NaFeO2 via Molten Media Reactions." *Inorganic Chemistry* 41, No. 23 (2002): 5961-5967. (Abstract only).
Bolibar, et al. "Synthesis, Characterization and Thermal Decomposition Study of Some Nickelnitro Derivatives." *Journal of Materials Chemistry* 7, No. 11 (1997): 2259-2264.
Cheng, et al. "Facile Controlled Synthesis of MnO2 Nanostructures of Novel Shapes and Their Application in Batteries." *Inorganic Chemistry* 45, No. 5 (2006): 2038-2044.
Chitrakar, et al. "A New Type of Manganese Oxide (MnO2 0.5H2O) Derived from Li1.6Mn1.6O4 and its Lithium Ion-Sieve Properties." *Chemistry of Materials* 12, No. 10 (2000): 3151-3157.
Choi, et al. "Proton Insertion Into Oxide Cathodes During Chemical Delithiation." *Electrochemical and Solid-State Letters* 9, No. 5 (2006): A241-A244.
Croguennec, et al. "Structural Characterisation of the Highly Deintercalated LixNi1.02O2 Phases (With x≤ 0.30) Basis of a presentation given at Materials Discussion No. 3, Sep. 26-29, 2000, University of Cambridge, UK." *Journal of Materials Chemistry* 11, No. 1 (2001): 131-141.
Crompton, Battery Reference Book, "Guidelines to battery selection", 3rd ed., Oxford: Reed Educational and Professional Publishing, Ltd. Chapter 2 (2000).
Dahn, et al. "Structure and Electrochemistry of Li1±yNiO2 and a New Li2 NiO2 Phase With the Ni (OH)2 Structure." *Solid State Ionics* 44, No. 1 (1990): 87-97 (abstract only).
Dai et al., "Preparation and Characterization of Nanostructured MnO2 for Lithium Batteries", Proc. 40th Power Sources Conf., pp. 283-286 (2002).
David, et al. "Structure Refinement of the Spinel-Related Phases Li2Mn2O4 and Li0.2Mn2O4." *Journal of Solid State Chemistry* 67, No. 2 (1987): 316-323.
Delmas, et al. "On the Behavior of the LixNiO2 System: an Electrochemical and Structural Overview." *Journal of Power Sources* 68, No. 1 (1997): 120-125.
Dominko, et al. "A Novel Coating Technology for Preparation of Cathodes in Li-ion Batteries." *Electrochemical and Solid-State Letters* 4, No. 11 (2001): A187-A190.
Dutta, et al. "Chemical Synthesis and Properties of Li1—δ—xNi1+δO2 and Li[Ni2]O4." *Journal of Solid State Chemistry* 96, No. 1 (1992): 123-131.
Ebner, et al. "The LiNiO2/Carbon Lithium-Ion Battery." *Solid State Ionics* 69, No. 3 (1994): 238-256.
Endres, et al. "Extraction of Lithium from Spinel Phases of the System Li1+xMn2—xO4—δ." *Journal of Power Sources* 69, No. 1 (1997): 145-156.
Fang, et al. "Low-Temperature Synthesis of Highly Crystallized LiMn2O4 from Alpha Manganese Dioxide Nanorods." *Journal of Power Sources* 184, No. 2 (2008): 494-497.
Feng et al. "Li+ Extraction/Insertion with Spinel-Type Lithium Manganese Oxides. Characterization of Redox-Type and Ion-Exchange-Type Sites", Langmuir 8:1861-1867 (1992).
Feng, et al. "Alkali Metal Ions Insertion/Extraction Reactions with Hollandite-Type Manganese Oxide in the Aqueous Phase." *Chemistry of Materials* 7, No. 1 (1995): 148-153.
Feng, et al. "Synthesis of Hollandite-Type Manganese Dioxide with H+ Form for Lithium Rechargeable Battery." *Journal of the Electrochemical Society* 141, No. 10 (1994): L135-L136.
Fong, et al. "A Powder Neutron Diffraction Study of A and Y Manganese Dioxide and of LiMn2O4." *Zeitschrift Fuer Kristallographie* 209, No. 12 (1994): 941-945.
Franger, et al. "Development of New Low Temperature Manganese Oxides as Lithium Insertion Compounds." *Recent Research Developments Solid State Ionics* 3 (2006): 1-22. (abstract only).
Gao, et al. "Synthesis and Characterization of Li1+xMn2—x O4 for Li-Ion Battery Applications." *Journal of The Electrochemical Society* 143, No. 1 (1996): 100-114.
Gummow, et al. "Improved Capacity Retention in Rechargeable 4 V Lithium/Lithium-Manganese Oxide (Spinel) Cells." *Solid State Ionics* 69, No. 1 (1994): 59-67.

(56) References Cited

OTHER PUBLICATIONS

Han, et al, "Pure Tetravalent Nickel in γ-Type Nickel Oxyhydroxide as Secondary Battery Electrode." *Journal of Materials Research* 13, No. 4 (1998): 880-882.
Hill, et al. "Electrochemical Synthesis of Beta-and Gamma-Manganese Dioxides Under Hydrothermal Conditions." *Electrochemical and Solid-State Letters* 4, No. 6 (2001): D1-D3.
Hunter, et al. "Nonaqueous Electrochemistry of Lambda MnO2." *Proc. Electrochem. Soc* 85 (1984): 4.
Hunter, et al. "Preparation of a New Crystal Form of Manganese Dioxide: λ—MnO2." *Journal of Solid State Chemistry* 39, No. 2 (1981): 142-147.
International Application No. PCT/US2018/03170, International Search Report with Written Opinion, dated Jul. 2, 2018.
International Application No. PCT/US2018/031701, International Preliminary Reporton Patentability, dated Sep. 24, 2019.
International Application No. PCT/US2018/031701, Second Written Opinion, dated May 9, 2019.
Ji, et al. "Simple Fabrication of Nano-Sized NiO2 Powder and its Application to Oxidation Reactions." *Applied Catalysis A*: General 282, No. 1 (2005): 25-30. (Abstract only).
Kanoh, et al. "In Situ Raman Spectroscopic Study on Electroinsertion of Li+ into a Pt/λ-MnO2 Electrode in Aqueous Solution." Electrochemical and Solid-State Letters 1, No. 1 (1998): 17-19.
Kanoh, et al. "Selective Electroinsertion of Lithium Ions Into a Pt/λ—MnO2 Electrode in the Aqueous Phase." *Langmuir* 7, No. 9 (1991): 1841-1842.
Kanzaki, et al. "Mechanism of Lithium Ion Insertion into λ—MnO2." *Journal of The Electrochemical Society* 138, No. 1 (1991): 333-334.
Kao, et al. "Phase Transformation of Gamma-EMD to Beta Manganese Dioxide During Digestion in Sulfuric Acid." *Journal of The Electrochemical Society* 134, No. 6 (1987): 1321-1325.
Kijima, et al. "Preparation and Characterization of Open Tunnel Oxide α—MnO2 Precipitated by Ozone Oxidation." *Journal of Solid State Chemistry* 159, No. 1 (2001): 94-102.
Kim, et al. "Direct Carbon-Black Coating on LiCoO2 Cathode Using Surfactant for High-Density Li-Ion Cell." *Journal of Power Sources* 139, No. 1 (2005): 289-294.
Komaba, et al. "Preparation and Electrochemical Performance of Composite Oxide of Alpha Manganese Dioxide and Li—Mn—O Spinel." *Electrochimica Acta* 50, No. 11 (2005): 2297-2305.
Komaba, et al. "Synthesis of Layered MnO2 by Calcination of KMnO4 for Rechargeable Lithium Battery Cathode." *Electrochimica Acta* 46, No. 1 (2000): 31-37.
Kosova, et al. "Comparative Study of LiCoO2 Surface Modified with Different Oxides." *Journal of Power Sources* 174, No. 2 (2007): 959-964.
Kozawa. "Formation of Manganate and Permanganate Ions from Manganese-Dioxide in Aqueous Solution." *Journal Electrochemical Society of Japan* 44, No. 8 (1976): 508-513.
Lander, et al. "Barium-Nickel Oxides with Tri-and Tetravalent Nickel." *Journal of the American Chemical Society* 73, No. 6 (1951): 2452-2454.
Larcher, et al. "Synthesis of MnO2 Phases from LiMn2O4 in Aqueous Acidic Media Mechanisms of Phase Transformations, Reactivity, and Effect of Bi Species." *Journal of The Electrochemical Society* 145, No. 10 (1998): 3392-3400.
Lavela, et al. "Chemical Delithiation, Thermal Transformations and Electrochemical Behaviour of Iron-Substituted Lithium Nickelate." In *Materials Research Society Symposium Proceedings*, vol. 658, pp. GG9-7. Cambridge University Press, 2000. (Abstract only).
Lavela, et al. "Effects of Partial Acid Delithiation on the Electrochemical Lithium Insertion Properties of Nickel-Stabilized LiMn2O4 Spinel Oxides." *Journal of Solid State Chemistry* 150, No. 1 (2000): 196-203.
Li, et al., "Electrocatalytic Activities of LiCo1—yMyO2 (M=Ni or Fe) Synthesized at Low Temperature and Acid-Delithiated Products for Oxygen Evolution/Reduction in Alkaline Solution." *Electrochimica Acta* 46, No. 5 (200))'. 717-722.

Linden and T. B. Rebby, *Handbook of Batteries*, New York: McGraw-Hill Co., Inc. (1995) "1.4 Classification of Cells and Batteries," pp. 1.9-1.11; "7.1 General Characteristics and Applications of Primary Batteries," pp. 7.3-7.7; "11/13 Lithium/Bismuth Oxide Cells," pp. 11-79 to 11-81; Chapter 12, "Silver Oxide Cells," pp. 12.1-12-16; "23.1 General Characteristics and Applications of Secondary Batteries," pp. 23.3-23.12.
Liu, et al. "Preparation and Alkali-Metal Ion Extraction/Insertion Reactions with Nanofibrous Manganese Oxide Having 2 x 4 Tunnel Structure." *Chemistry of Materials* 15, No. 19 (2003): 3696-3703.
Lu, et al. "Characterization of Structure and Electrochemical Properties of Lithium Manganese Oxides for Lithium Secondary Batteries Hydrothermally Synthesized from δ—KxMnO2." *Electrochimica Acta* 49, No. 14 (2004): 2361-2367.
Lubin, et al. "Chemical Lithium Extraction from Manganese Oxides for Lithium Rechargeable Batteries." *Journal of Power Sources* 34, No. 2 (1991): 161-173.
Maruta, et al. "Low-Temperature Synthesis of Lithium Nickelate Positive Active Material from Nickel Hydroxide for Lithium Cells." *Journal of Power Sources* 90, No. 1 (2000): 89-94.
Morales, et al. "Acid-Delithiated Li1—x(NiyCo1—y)1+ xO2 as Insertion Electrodes in Lithium Batteries." *Journal of Solid State Chemistry* 113, No. 1 (1994): 182-192. (Abstract only).
Morales, et al. "Cation Distribution and Chemical Deintercalation of Li1—xNi1+xO2." *Materials Research Bulletin* 25, No. 5 (1990): 623-630.
Morales, et al. "Thermal Behaviour of Chemically Deintercalated Li1—1Ni1+xO2." *Journal of Thermal Analysis* 38, No. 3 (1992): 295-301. (Abstract only).
Mosbah, et al. "Phases LixMnO2λ Rattachees au Type Spinelle." *Materials Research Bulletin* 18, No. 11 (1983): 1375-1381.
Motohashi, et al. "Synthesis and Properties of CoO2, the x = 0 End Member of the LixCoO2 and NaxCoO2 Systems." *Chemistry of Materials* 19, No. 21 (2007): 5063-5066.
Mukai, et al., "Structural and Magnetic Nature for Fully Delithiated $Li_xNiO_2$: Comparative Study Between Chemically and Electrochemically Prepared Samples." The Journal of Physical Chemistry C 114, No. 18 (2010): 8626-8632.
Nishimura, et al., "Manganese Dioxide Particles Produced by Ozonation in Acidic Manganese Sulfate Solutions." *Shigen-to-Sozai*. 107 (1991): 805-810.
Oesten, et al., "Structural Aspects of Undoped and Doped Nickel Hydroxides." *Ionics* 2, No. 3 (1996): 293-301.
Ohzuku, et al. "Electrochemistry and Structural Chemistry of LiNiO2 (R3m) for 4 Volt Secondary Lithium Cells." *Journal of The Electrochemical Society* 140, No. 7 (1993): 1862-1870.
Ohzuku, et al. "Electrochemistry of Manganese Dioxide in Lithium Nonaqueous Cell III. X-Ray Diffractional Study on the Reduction of Spinel-Related Manganese Dioxide." *Journal of The Electrochemical Society* 137, No. 3 (1990): 769-775.
Ooi, et al. "Lithium-Ion Insertion/Extraction Reaction with λ—MnO2 in the Aqueous Phase." *Chemistry Letters* 17, No. 6 (1988): 989-992.
Ooi, et al. "Mechanism of Lithium (1+) Insertion in Spinel-Type Manganese Oxide. Redox And Ion-Exchange Reactions." *Langmuir* 7, No. 6 (1991): 1167-1171.
Palacin, et al. "Low-Temperature Synthesis of LiNiO2 Reaction Mechanism, Stability, and Electrochemical Properties." *Journal of The Electrochemical Society* 144, No. 12 (1997):4226-4236.
Patrice, et al. "Understanding the Second Electron Discharge Plateau in MnO2-Based Alkaline Cells." *Journal of The Electrochemical Society* 148, No. 5 (2001): A448-A455.
Puckhaber, et al. "Particle Sizing-Laser Diffraction: Millennium-Link for Particle Size Analysis." Powder Handling and Processing 11, No. 1 (1999): 91-95.
Rao, et al., "Electrochemical Behaviour of Solid Lithium Nickelate (LiNiO2) in an Aqueous Electrolyte System." *Journal of Solid State Electrochemistry* 4 (1999): 17-23.
Read, et al. "Low Temperature Performance of λ MnO2 in Lithium Primary Batteries." *Electrochemical and Solid-State Letters* 4, No. 10 (2001): A162-A165.

(56) References Cited

OTHER PUBLICATIONS

Rossouw, et al. "Alpha Manganese Dioxide for Lithium Batteries: a Structural and Electrochemical Study." *Materials Research Bulletin* 27, No. 2 (1992): 221-230.

Schilling, et al. "Modification of the High-Rate Discharge Behavior of Zn—MnO2 Alkaline Cells Through the Addition of Metal Oxides to the Cathode." *ITE Letters on Batteries, New Technologies & Medicine* 2, No. 3 (2001): 341-348.

Schilling, et al. "Thermodynamic Stability of Chemically Delithiated Li (LixMn2—x) O4." *Journal of The Electrochemical Society* 145, No. 2 (1998): 569-575.

Shen, et al. "Phase Transitions and Ion Exchange Behavior of Electrolytically Prepared Manganese Dioxide." *Journal of Solid State Chemistry* 64, No. 3 (1986): 270-282.

Stoyanova, et al. "Effect of Mn-Substitution for Co on the Crystal Structure and Acid Delithiation of LiMnyCo1—yO2 Solid Solutions." *Solid State Ionics* 73, No. 3-4 (1994): 233-240.

Stoyanova, et al. "New Data on Chemical Delithiation of LixNi2—xO2 (0.6 < x < 1)." *Journal of Solid State Chemistry* 108, No. 2 (1994): 211-218.

Sun, et al. "Low Temperature Synthesis of Layered LiNiO2 Cathode Material in Air Atmosphere by Ion Exchange Reaction." *Solid State Ionics* 177, No. 13 (2006): 1173-1177.

Takeda, et al. "Crystal Chemistry and Physical Properties of La2—xSrxNiO4 (0 < x < 1.6)." *Materials Research Bulletin* 25, No. 3 (1990): 293-306.

Tang, et al. "Lithium Ion Extraction from Orthorhombic LiMnO2 in Ammonium Peroxodisulfate Solutions." *Journal of Solid State Chemistry* 142, No. 1 (1999): 19-28.

Tang, et al. "Preparation of Plate-Form Manganese Oxide by Selective Lithium Extraction from Monoclinic Li2MnO3 under Hydrothermal Conditions." *Chemistry of Materials* 12, No. 11 (2000): 3271-3279.

Tessier, et al., "Structural and Textural Evolution of Zinc-Substituted Nickel Hydroxide Electrode Materials Upon Ageing in KOH and Upon Redox Cycling." *Solid State Ionics* 133, No. 1 (2000): 11-23.

Thackeray. "Manganese Oxides for Lithium Batteries." *Progress in Solid State Chemistry* 25, No. 1 (1997): 1-71.

Venkatraman, et al. "Factors Influencing the Chemical Lithium Extraction Rate from Layered LiNi1—y—zCoyMnzO2 Cathodes." *Electrochemistry Communications* 6, No. 8 (2004): 832-837.

Venkatraman, et al., "Investigation of the Possible Incorporation of Protons into Oxide Cathodes During Chemical Delithiation." *Journal of Solid State Chemistry* 177, No. 11 (2004): 4244-4250.

Walanda, et al. Hydrothermal MnO2: Synthesis, Structure, Morphology and Discharge Performance. *Journal of Power Sources* 139, No. 4 (2005): 325-341.

Wang, et al. "A Novel Chemically Synthesized Manganese Dioxide—Its Preparation and Structural Characterization." *Progress in Batteries and Battery Materials* 17 (1998): 222-231.

Wang, et al. "Selected-Control Hydrothermal Synthesis of α- and β—MnO2 Single Crystal Nanowires." *Journal of the American Chemical Society* 124, No. 12 (2002): 2880-2881.

Xia et al. "Study on the electrochemical performance of—MnO2 in alkaline solution", *Dianyuan Jishu*, vol. 23(Suppl.):74-76 (1999)(abstract only).

Yang, et al. "Synthesis of Li1.33Mn1.67O4 Spinels with Different Morphologies and Their Ion Adsorptivities After Delithiation." *Journal of Materials Chemistry* 10, No. 8 (2000): 1903-1909.

Yang, et al., "Highly Swollen Layered Nickel Oxide With A Trilayer Hydrate Structure." *Chemistry of Materials* 20, No. 2 (2007): 479-485.

Yin, et al. "X-ray/Neutron Diffraction and Electrochemical Studies of Lithium De/Re-Intercalation in Li1—xCo1/3Ni1/3Mn1/3O2 (x = 0 → 1)." *Chemistry of Materials* 18, No. 7 (2006): 1901-1910.

Zhecheva, et al. "New Phases Obtained by Acid Delithiation of Layered LiMO2 (M = Co, Ni)." In *Materials Science Forum*, vol. 152, pp. 259-262. Trans Tech Publications, 1994.

Scanning Transmission Electron Microscopy (STEM)

Convergent Beam Electron Diffraction (CBED)

BATTERY INCLUDING BETA-DELITHIATED LAYERED NICKEL OXIDE ELECTROCHEMICALLY ACTIVE CATHODE MATERIAL

CROSS REFERENCE TO RELATED APPLICATIONS

This application is a continuation of U.S. patent application Ser. No. 15/973,653, filed May 8, 2018, which claims the benefit under 35 U.S.C. § 119(e) of U.S. Provisional Patent Application No. 62/503,829, filed May 9, 2017, the entire disclosures of which are incorporated herein by reference.

FIELD OF THE INVENTION

The invention relates to an electrochemically active cathode material and, more specifically, relates to a non-stoichiometric beta-delithiated layered nickel oxide electrochemically active cathode material and a battery including same.

BACKGROUND OF THE INVENTION

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode. An ionically conductive electrolyte solution is in intimate contact with the cathode, the anode, and the separator. The battery components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. An electrolyte is in contact with the anode, the cathode, and the separator. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of electrochemically active anode and/or cathode materials to provide increased capacity and service life. Batteries, however, also come in common sizes, such as the AA, AAA, AAAA, C, and D battery sizes, that have fixed external dimensions and constrained internal volumes. The ability to increase electrochemically active material loading alone to achieve better performing batteries is thus limited.

The electrochemically active cathode material of the battery is another design feature that may be adjusted in order to provide increased performance. For example, electrochemically active material that has higher volumetric and gravimetric capacity may result in a better performing battery. Similarly, electrochemically active material that has a higher oxidation state may also result in a better performing battery. The electrochemically active material that is selected, however, must provide an acceptable closed circuit voltage, or running voltage, range for the devices that the battery may power. The device may be damaged if the open-circuit voltage (OCV) or running voltages of the battery are too high. Conversely, the device may not function at all if the running voltage of the battery is too low.

In addition, an electrochemically active cathode material, such as a high oxidation state transition metal oxide, may be highly reactive. The highly reactive nature of such an electrochemically active cathode material may lead to gas evolution when the electrochemically active cathode material is incorporated within a battery and is brought into contact with the electrolyte solution. Any gas that is evolved may lead to an increase in pressure within the battery resulting in structural integrity issues, such as continuity within the cathode, and/or leakage of electrolyte from the battery. The high oxidation state transition metal oxide may detrimentally also react with other battery components, such as conductive carbon additives, e.g., graphite; other additives, e.g., surfactant(s); and/or the separator. The high oxidation state transition metal oxide may also have a tendency to react with the electrolyte, which may lead to other structural issues within the battery, such as cathode swelling, and consumption of water resulting in an unfavorable water balance within the battery. Also, a battery including a high oxidation state transition metal oxide as an electrochemically active cathode material may, for example, exhibit thermodynamic instability and exhibit an elevated rate of self-discharge when the battery is stored for an extended period of time. In addition, the ratios of both water and potassium hydroxide content to the electrochemically active material content of the battery needs to be appropriately balanced to maximize utilization of both of the electrochemically active electrode materials. Furthermore, the selection of suitable ratios of both water and potassium hydroxide content to electrochemically active material content may provide increased battery performance across multiple discharge rate regimes.

There exists a need to provide an electrochemically active cathode material for a battery that address the needs discussed above. The non-stoichiometric beta-delithiated layered nickel oxide electrochemically active cathode material of the present invention addresses, inter alia, these needs.

SUMMARY OF THE INVENTION

In one embodiment, the invention is directed towards a battery. The battery includes a cathode, an anode, a separator between the cathode and the anode, and an electrolyte. The cathode includes a conductive additive and an electrochemically active cathode material. The electrochemically active cathode material includes a non-stoichiometric beta-delithiated layered nickel oxide. The non-stoichiometric beta-delithiated layered nickel oxide has a chemical formula. The chemical formula is $Li_xA_yNi_{1+a-z}M_zO_2 \cdot nH_2O$ where x is from about 0.02 to about 0.20; y is from about 0.03 to about 0.20; a is from about 0.02 to about 0.2; z is from about 0 to about 0.2; and n is from about 0 to about 1. Within the chemical formula, A is an alkali metal. The alkali metal includes potassium, rubidium, cesium, and any combination thereof. Within the chemical formula, M comprises an alkaline earth metal, a transition metal, a non-transition metal, and any combination thereof. The alkaline earth metal can include magnesium, calcium, and a combination thereof.

The transition metal can include cobalt, manganese, titanium, yttrium, and a combination thereof. The non-transition metal can include aluminum, gallium, indium, germanium, tin and any combination thereof. The anode includes an electrochemically active anode material. The electrochemically active anode material includes zinc, zinc alloy, and any combination thereof.

In another embodiment, the invention is directed to an electrochemically active cathode material including a non-stoichiometric beta-delithiated layered nickel oxide having a layered crystal structure, the layered crystal structure characterized by a lattice including a plurality of $NiO_2$ layers, wherein the $NiO_2$ lattice comprises an ordered O1-type layer stacking sequence, at least one of an O3-type layer stacking fault, and at least one of a γ-nickel oxyhydroxide (γ-NiOOH)-like layer stacking fault.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, Handbook of Batteries (4th ed. 2011). Secondary batteries are intended to be recharged. Secondary batteries may be discharged and recharged many times, e.g., more than fifty times, a hundred times, or more. Secondary batteries are described, for example, in David Linden, Handbook of Batteries (4th ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries having aqueous, nonaqueous, ionic liquid, and solid state electrolyte systems. Primary and secondary batteries including the aforementioned electrolytes are thus within the scope of this application and the invention is not limited to any particular embodiment.

Figure 1:
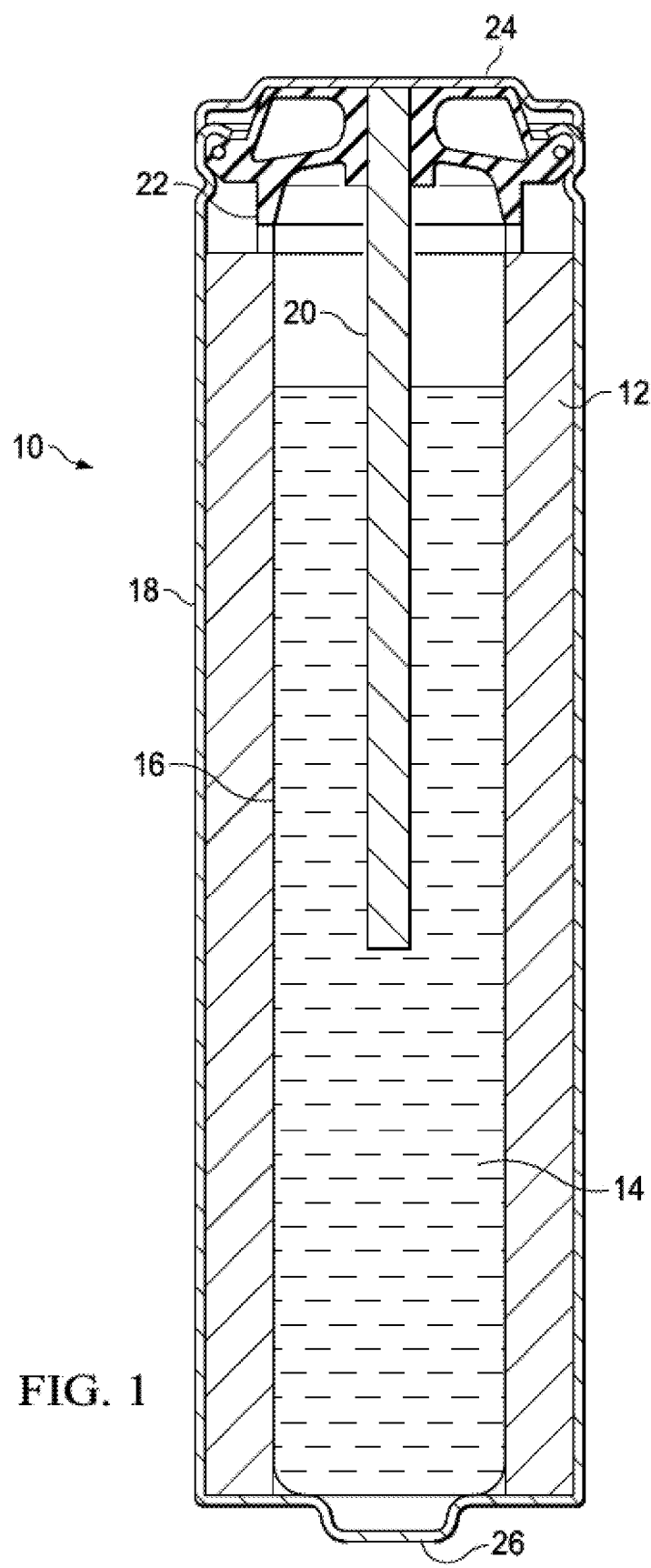
FIG. 1 is a cross-section of an embodiment of a primary alkaline battery including beta-delithiated layered nickel oxide electrochemically active cathode material.

Referring to FIG. 1, there is shown a primary alkaline electrochemical cell, or battery, 10 including a cathode 12, an anode 14, a separator 16, and a housing 18. Battery 10 also includes a current collector 20, a seal 22, and an end cap 24. The end cap 24 serves as the negative terminal of the battery 10. A positive pip 26 is at the opposite end of the battery 10 from the end cap 24. The positive pip 26 may serve as the positive terminal of the battery 10. An electrolytic solution is dispersed throughout the battery 10. The cathode 12, anode 14, separator 16, electrolyte, current collector 20, and seal 22 are contained within the housing 18. Battery 10 can be, for example, a AA, AAA, AAAA, C, or D size alkaline battery.

The housing 18 can be of any conventional type of housing commonly used in primary alkaline batteries and can be made of any suitable base material, for example cold-rolled steel or nickel-plated cold-rolled steel. The housing 18 may have a cylindrical shape. The housing 18 may be of any other suitable, non-cylindrical shape. The housing 18, for example, may have a shape comprising at least two parallel plates, such as a rectangular, square, or prismatic shape. The housing 18 may be, for example, deep-drawn from a sheet of the base material, such as cold-rolled steel or nickel-plated steel. The housing 18 may be, for example, drawn into a cylindrical shape. The housing 18 may have at least one open end. The housing 18 may have a closed end and an open end with a sidewall therebetween. The interior surface of the sidewall of the housing 18 may be treated with a material that provides a low electrical-contact resistance between the interior surface of the sidewall of the housing 18 and an electrode, such as the cathode 12. The interior surface of the sidewall of the housing 18 may be plated, e.g., with nickel, cobalt, and/or painted with a carbon-loaded paint to decrease contact resistance between, for example, the internal surface of the sidewall of the housing 18 and the cathode 12.

The cathode 12 includes at least one electrochemically active cathode material. The electrochemically active cathode material may be a non-stoichiometric beta-delithiated layered nickel oxide. The beta-delithiated layered nickel oxide may have the general chemical formula $Li_xA_yNi_{1+a-z}M_zO_2 \cdot nH_2O$ where x is from about 0.02 to about 0.20; y is from about 0.03 to about 0.20; a is from about 0.02 to about 0.2; z is from about 0 to about 0.2; n is from about 0 to about 1; A comprises an alkali metal; and M comprises an alkaline earth metal, a transition metal, a non-transition metal, and any combination thereof. Because a is positive such that a non-stoichiometric amount of nickel (and/or other metal M) (i.e., excess nickel relative to the amount of nickel (and/or other metal) needed to balance the charge of the oxygen atoms is necessarily present in the material, the beta-delithiated layered nickel oxide is considered to be non-stoichiometric. The non-stoichiometric beta-delithiated layered nickel oxide may have the general chemical formula $Li_xA_yNi_{1+a-z}M_zO_2 \cdot nH_2O$ where x is from about 0.03 to about 0.12; y is from about 0.03 to about 0.20; a is from about 0.02 to about 0.2; z is from about 0 to about 0.2; n is from about 0 to about 1; A comprises an alkali metal; and M comprises an alkaline earth metal, a transition metal, a non-transition metal, and any combination thereof.

In embodiments of the non-stoichiometric beta-delithiated layered nickel oxide, x can be in a range of 0.02 to 0.2, for example, 0.02 to 0.18, 0.02 to 0.16, 0.02 to 0.15, 0.03 to 0.20, 0.03 to 0.19, 0.03 to 0.15, 0.03 to 0.12, 0.05 to 0.19, or 0.05 to 0.15. In embodiments, y can be in a range of 0.03 to 0.20, for example, 0.03 to 0.17, 0.03 to 0.15, 0.03 to 0.13, 0.06 to 0.20, 0.06 to 0.17, 0.06 to 0.15, 0.06 to 0.13, 0.08 to 0.17, 0.08 to 0.15, or 0.08 to 0.13. In embodiments, a can be in a range of 0.02 to 0.20, for example, 0.02 to 0.18, 0.02 to 0.16, 0.03 to 0.20, 0.03 to 0.17, 0.03 to 0.15, 0.04 to 0.20, 0.04 to 0.17, 0.04 to 0.15, 0.04 to 0.13, or 0.04 to 0.11. When a is less than 0.02, it is found that the stability of the non-stoichiometric beta-delithiated layered nickel oxide is poor. In embodiments, z can be in a range of 0 to 0.20, for example, 0.03 to 0.20, or 0.04 to 0.20. In embodiments, z can be 0. In embodiments wherein z is 0, a can be in a range of 0.02 to 0.20, for example, 0.02 to 0.16, 0.03 to 0.15, or 0.02 to 0.15. In embodiments, the difference (a-z) can be in a range of 0.02 to 0.20, for example, 0.02 to 0.16, 0.04 to 0.20, 0.04 to 0.16, 0.06 to 0.16, or 0.08 to 0.18. In embodiments, A can be potassium and y can be in a range of 0.06 to 0.14, for example, 0.08 to 0.13. In embodiments, z is 0 and 1+(a-z) is greater than 1, such that Ni itself is present in a non-stoichiometric amount, for example, 1+(a-z) can be in a range of about 1.02 to about 1.20.

The electrochemically active cathode material may have a gravimetric capacity. The non-stoichiometric beta-delithiated layered nickel oxide electrochemically active cathode material may have a gravimetric capacity greater than about 340 mAh/g, or greater than about 350 mAh/g. The non-stoichiometric beta-delithiated layered nickel oxide electrochemically active cathode material may have a gravimetric capacity from about 340 mAh/g to about 400 mAh/g, from about 350 mAh/g to about 400 mAh/g, from about 340 mAh/g to about 380 mAh/g, or from about 360 mAh/g to 400 mAh/g.

Elements from Group 1A of the Periodic Table of Elements are commonly referred to as alkali metals. The alkali metal may include an element, or any combination of elements, from Group 1A of the Periodic Table of Elements. The alkali metal may comprise, for example, potassium (K), rubidium (Rb), cesium (Cs), and any combination thereof.

Elements from Group IIA of the Periodic Table of Elements are typically referred to as alkaline earth metals. The alkaline earth metal may comprise an element, or any combination of elements, from Group IIA of the Periodic Table of Elements. The alkaline earth metal may comprise, for example, magnesium (Mg), calcium (Ca) and a combination thereof.

Elements from Groups IB-VIIIB of the Periodic Table of Elements are typically referred to as transition metals. The transition metal may comprise an element, or any combination of elements, from Groups IB-VIIIB of the Period Table of Elements. The transition metal may comprise, for example, cobalt (Co), manganese (Mn), yttrium (Y), titanium (Ti), zinc (Zn), and any combination thereof.

The non-transition metal may comprise, for example, aluminum (Al), gallium (Ga), germanium (Ge), indium (In), tin (Sn), and any combination thereof.

The alkali metal may be, for example, potassium (K). The chemical formula of the non-stoichiometric beta-delithiated layered nickel oxide may be, for example, $Li_xK_yNi_{1+a-z}M_zO_2 \cdot nH_2O$ where x is from about 0.02 to about 0.20; y is from about 0.03 to about 0.20; a is from about 0.02 to about 0.2; z is from about 0 to about 0.2; n is from about 0 to about 1. The chemical formula of the non-stoichiometric beta-delithiated layered nickel oxide may be, for example, $Li_xK_yNi_{1+a-z}M_zO_2 \cdot nH_2O$ where x is from about 0.02 to about 0.20; y is from about 0.08 to about 0.13; a is from about 0.02 to about 0.2; z is from about 0 to about 0.2; n is from about 0 to about 1; and M comprises an alkaline earth metal, a transition metal, a non-transition metal, and any combination thereof. The chemical formula of the non-stoichiometric beta-delithiated layered nickel oxide may be, for example, $Li_{0.13}K_{0.13}Ni_{1.16}O_2 \cdot 0.26H_2O$ or $Li_{0.07}K_{0.13}Ni_{1.11}O_2 \cdot 0.53H_2O$.

The alkaline earth metal may be, for example, magnesium (Mg). The chemical formula of the non-stoichiometric beta-delithiated layered nickel oxide may be, for example, $Li_xK_yNi_{1+a-z}Mg_zO_2 \cdot nH_2O$ wherein x is from about 0.02 to about 0.2; y is from about 0.03 to about 0.2; a is from about 0.02 to about 0.2; z is from about 0 to about 0.2; and n is from about 0 to about 1. The chemical formula of the non-stoichiometric beta-delithiated layered nickel oxide may be, for example, $Li_{0.15}K_{0.10}Ni_{1.05}Mg_{0.04}O_2 \cdot 0.24H_2O$.

The transition metal may be, for example, cobalt (Co). The chemical formula of the non-stoichiometric beta-delithiated layered nickel oxide may be, for example, $Li_xK_yNi_{1+a-z}Co_zO_2 \cdot nH_2O$ wherein x is from about 0.02 to about 0.2; y is from about 0.03 to about 0.2; a is from about 0.02 to about 0.2; z is from about 0 to about 0.2; and n is from about 0 to about 1. The chemical formula of a non-stoichiometric beta-delithiated layered nickel oxide may be, for example $Li_{0.04}K_{00.03}Ni_{1.03}Co_{0.03}O_2 \cdot nH_2O$.

The non-transition metal may be, for example, aluminum (Al). The chemical formula of the non-stoichiometric beta-delithiated layered nickel oxide may be, for example, $Li_xK_yNi_{1+a-z}Al_zO_2 \cdot nH_2O$ wherein x is from about 0.02 to about 0.2; y is from about 0.03 to about 0.2; a is from about 0.02 to about 0.2; z is from about 0 to about 0.2; and n is from about 0 to about 1. The chemical formula of a non-stoichiometric beta-delithiated layered nickel oxide may be, for example, $Li_{0.12}K_{0.09}Ni_{1.08}Al_{0.02}O_2 \cdot 0.18H_2O$.

The content of the alkali metal(s), alkaline earth metal(s), transition metal(s), and/or non-transition metal(s) within the non-stoichiometric beta-delithiated layered nickel oxide may be determined by any acceptable method known in the art. For example, the content of the alkali metal(s) and transition metal(s) within the non-stoichiometric beta-delithiated layered nickel oxide may be determined by inductively coupled plasma atomic emission spectroscopy (ICP-AES) and/or atomic absorption (AA) spectroscopy. ICP-AES and/or AA analyses may be completed, for example, using standard methods as described, for example, by J. R. Dean, Practical Inductively Coupled Plasma Spectroscopy, pp. 65-87 (2005) and B. Welz and M. B. Sperling, Atomic Absorption Spectrometry, pp. 221-294 (3rd ed. 1999). An Ultima 2 ICP spectrometer, available from HORIBA Scientific (Kyoto, Japan), may be used to complete ICP-AES analysis on a sample material, such as a non-stoichiometric beta-delithiated layered nickel oxide. ICP-AES analysis of the non-stoichiometric beta-delithiated layered nickel oxide can be performed at varying wavelengths depending upon the elements contained within the non-stoichiometric beta-delithiated layered nickel oxide. The content of potassium, as is determined by ICP-AES, within the non-stoichiometric beta-delithiated layered nickel oxide may be less than about 7 weight percent. The content of potassium, as is determined by ICP-AES, within the non-stoichiometric beta-delithiated layered nickel oxide may be from about 2 weight percent to about 7 weight percent, or about 3 weight percent to about 7 weight percent.

The water content within the non-stoichiometric beta-delithiated layered nickel oxide may be determined by any acceptable method known in the art. For example, the water content within the non-stoichiometric beta-delithiated layered nickel oxide may be determined by thermogravimetric analysis (TGA). TGA determines, for example, the absorbed and adsorbed water of the sample material; the water content within the crystal lattice of the sample material; and the total water content within the sample material by measuring the change in weight of the sample as a function of increasing temperature. TGA is described, for example, by R. F. Speyer, Thermal Analysis of Materials (1994). A Q5000 analyzer, available from TA Instruments (Newcastle, Del., USA), may be used to complete TGA on a sample material, such as a non-stoichiometric beta-delithiated layered nickel oxide.

Powder X-ray diffraction (pXRD) is an analytical technique that is used to characterize the crystal lattice structure of a sample material, such as a crystalline powder. XRD analysis of a crystalline sample material will result in a characteristic diffraction pattern consisting of peaks of varying intensities, widths, and diffraction angles (peak positions) corresponding to diffraction planes in the crystal structure of the sample material. XRD patterns can be measured with an X-ray diffractometer using CuKα radiation by standard methods as is described, for example, by B. D. Cullity and S. R. Stock, Elements of X-ray Diffraction (3rd ed. 2001). A D-8 Advance X-ray diffractometer, available from Bruker Corporation (Madison, Wis., USA), may be used to complete powder XRD analysis on a sample material, such as a non-stoichiometric beta-delithiated layered nickel oxide. The unit cell parameters, such as unit cell lengths and angles, of the sample material can be determined, for example, by Rietveld refinement of the XRD pattern. Rietveld refinement is described, for example, by H. M. Rietveld, "A Profile Refinement Method for Nuclear and Magnetic Structures", Journal of Applied Crystallography, pp. 65-71 (1969).

The crystallite size of the sample material can be determined by peak broadening of the XRD pattern of a sample material that contains a silicon (Si) standard. Peak broadening analysis may be completed, for example, by the single-peak Scherrer method or the Warren-Averbach method as is discussed, for example, by H. P. Klug and L. E. Alexander, "X-ray Diffraction Procedures for Polycrystalline and Amorphous Materials", Wiley, pp. 618-694 (1974). The Warren-Averbach method may also be used to determine the residual strain and stress of the sample material.

The full width at half maximum (FWHM) can be used to characterize the relative sharpness, or broadness, of the lines in the diffraction pattern of the sample material. The FWHM can be determined by measuring the intensity of a peak; dividing the measured intensity by two to calculate half intensity (half height); and measuring the width of the peak at the calculated half height.

The normalized intensity can be used, along with peak position, to compare the relative efficiency of diffraction associated with the particular diffraction planes within the crystal lattice of the sample material. The normalized intensity may be calculated for peaks within the same XRD pattern. All peaks of the XRD pattern may be normalized to the peak having the highest intensity (the reference peak). Normalization, which is reported in percent, occurs by dividing the intensity of the peak expressed in counts being normalized by the intensity of the reference peak expressed in counts and multiplying by 100. For example, the reference peak may have an intensity of 425 and the peak being normalized may have an intensity of 106. The normalized intensity of the peak is 25%, e.g., [(106/425)·100]. The reference peak will have a normalized intensity of 100%.

The resulting XRD pattern may be compared with known XRD patterns. The comparative XRD patterns may be generated from known sample materials. In addition, the resulting XRD pattern may be compared with known XRD patterns within, for example, the Powder Diffraction File (PDF) database, available from International Centre for Diffraction Data (Newton Square, Pa., USA), or the Inorganic Crystal Structure Database (ICSD), available from FIZ Karlsruhe (Eggenstein-Leopoldshafen, Germany). The comparison to known sample materials or the PDF (International center for Diffraction Data, Newton Square, Pa.) determines if the resulting XRD pattern of the sample material is distinct, similar, or equivalent to known XRD patterns of materials. Known XRD patterns within the PDF database for comparison to, for example, beta-delithiated layered nickel oxide include PDF #00-06-0141 for beta-nickel oxyhydroxide; PDF #00-00675 for gamma-nickel oxyhydroxide; PDF #00-006-0075 for nickel oxide; PDF #00-059-0463 for beta-nickel hydroxide.

Figure 4:
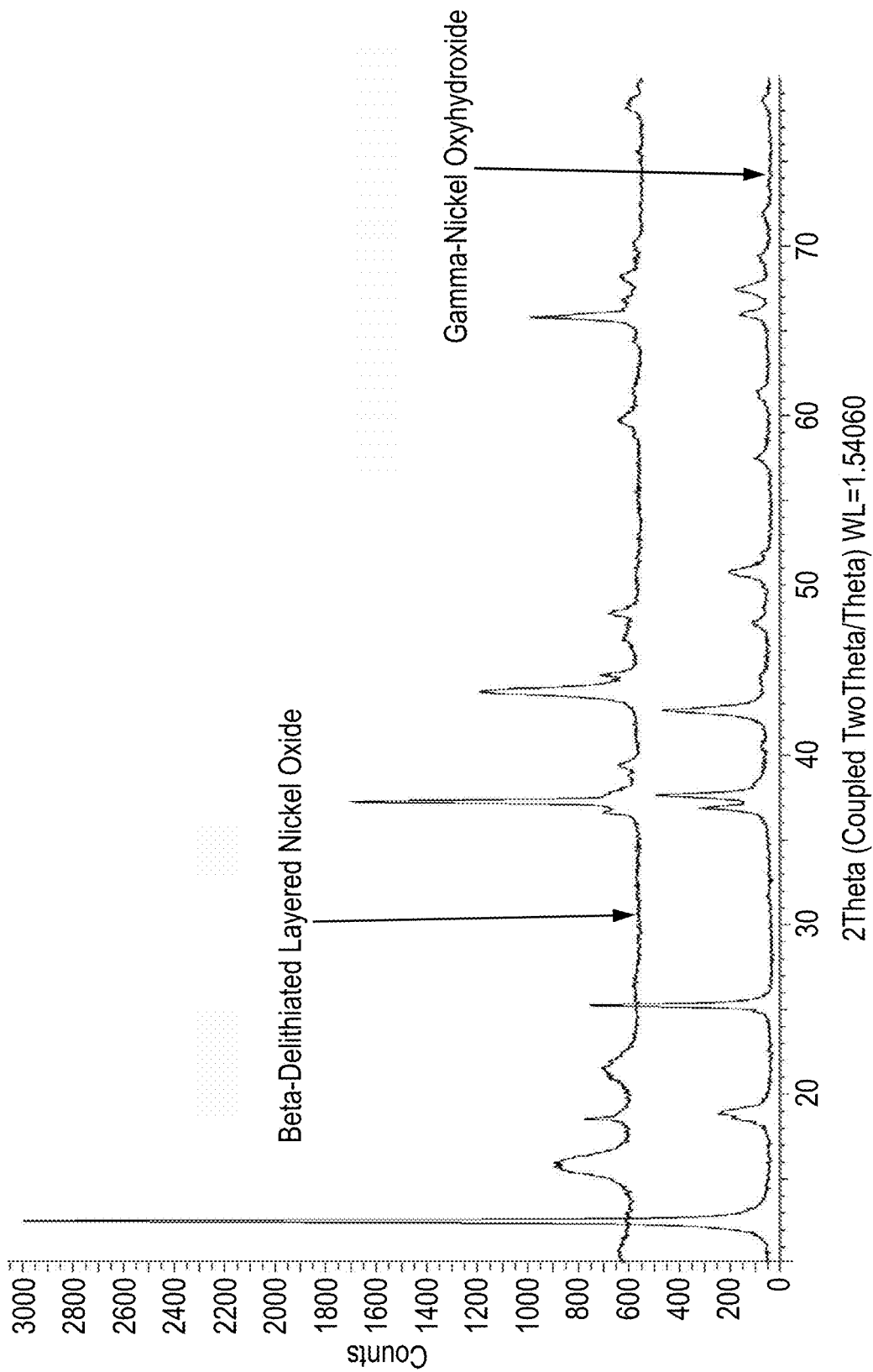
FIG. 4 includes a powder X-ray diffraction pattern for an embodiment of non-stoichiometric beta-delithiated layered nickel oxide (upper) and a powder X-ray diffraction pattern for a gamma-delithiated layered nickel oxide having gamma-NiOOH-type structure with P3-type layer stacking (lower).

The non-stoichiometric beta-delithiated layered nickel oxide may have a characteristic powder X-ray diffraction pattern. An example of a XRD pattern for a non-stoichiometric beta-delithiated layered nickel oxide is depicted in FIG. 4 (upper). The measured XRD pattern does not correspond to any X-ray diffraction patterns reported, for example, in the PDF database. The XRD pattern may include several peaks, or combination of peaks, that are indicative of the beta-delithiated layered nickel oxide. The XRD pattern may include characteristic FWHM values for the several peaks of the beta-delithiated layered nickel oxide. The XRD pattern may also include characteristic normalized intensities for the several peaks of the non-stoichiometric beta-delithiated layered nickel oxide. The XRD pattern of the non-stoichiometric beta-delithiated layered nickel oxide may include a first peak. The first peak may have a peak position on the XRD pattern of from about $14.9°2\theta$ to about $16.9°2\theta$. The first peak may be, for example, at about $15.4°2\theta$. The XRD pattern of the non-stoichiometric beta-delithiated layered nickel oxide may include a second peak. The second peak may have a peak position on the XRD pattern of from about $21.3°2\theta$ to about $22.7°2\theta$. The second peak may be, for example, at about $22.1°2\theta$. The XRD pattern of the non-stoichiometric beta-delithiated layered nickel oxide may include a third peak. The third peak may have a peak position on the XRD pattern of from about $37.1°2\theta$ to about $37.4°2\theta$. The third peak may be, for example, at about $37.3°2\theta$. The XRD pattern of the non-stoichiometric beta-delithiated layered nickel oxide may include a fourth peak. The fourth peak may have a peak position on the XRD pattern of from about $43.2°2\theta$ to about $44.0°2\theta$. The fourth peak may be, for example, at about $43.6°2\theta$. The XRD pattern of the non-stoichiometric beta-delithiated layered nickel oxide may include a fifth peak. The fifth peak may have a peak position on the XRD pattern of from about $59.6°2\theta$ to about $60.6°2\theta$. The fifth peak may be, for example, at about 60.1°2θ. The XRD pattern of the non-stoichiometric beta-delithiated layered nickel oxide may include a sixth peak. The sixth peak may have a peak position on the XRD pattern of from about 65.4°2θ to about 65.9°2θ. The sixth peak may be, for example, at about 65.7°2θ. The XRD pattern of the non-stoichiometric beta-delithiated layered nickel oxide may include a seventh peak. The seventh peak may have a peak position on the XRD pattern of from about 10.8°2θ to about 12.0°2θ. The seventh peak may be, for example, at about 11.2°2θ. The XRD pattern of the non-stoichiometric beta-delithiated layered nickel oxide may include an eighth peak. The eighth peak may have a peak position on the XRD pattern of from about 48.1°2θ to about 48.6°2θ. The eighth peak may be, for example, at about 48.3°2θ.

The first peak of the XRD pattern of the non-stoichiometric beta-delithiated layered nickel oxide may have a FWHM (FWHM). The FWHM of the first peak may be from about 1.01°2θ to about 2.09°2θ. The FWHM of the first peak may be, for example, about 1.37°2θ. The second peak of the XRD pattern of the non-stoichiometric beta-delithiated layered nickel oxide may have a FWHM. The FWHM of the second peak may be from about 0.86°2θ to about 1.95°2θ. The FWHM of the second peak may be, for example, about 1.37°2θ. The third peak of the XRD pattern of the non-stoichiometric beta-delithiated layered nickel oxide may have a FWHM. The FWHM of the third peak may be from about 0.23°2θ to about 0.41°2θ. The FWHM of the third peak may be, for example, about 0.28°2θ. The fourth peak of the XRD pattern of the non-stoichiometric beta-delithiated layered nickel oxide may have a FWHM. The FWHM of the fourth peak may be from about 0.40°2θ to about 0.75°2θ. The FWHM of the fourth peak may be, for example, about 0.60°2θ. The fifth peak of the XRD pattern of the non-stoichiometric beta-delithiated layered nickel oxide may have a FWHM. The FWHM of the fifth peak may be from about 0.57°2θ to about 1.45°2θ. The FWHM of the fifth peak may be, for example, about 0.92°2θ. The sixth peak of the XRD pattern of the non-stoichiometric beta-delithiated layered nickel oxide may have a FWHM. The FWHM of the sixth peak may be from about 0.27°2θ to about 0.53°2θ. The FWHM of the sixth peak may be, for example, about 0.36°2θ. The seventh peak of the XRD pattern of the non-stoichiometric beta-delithiated layered nickel oxide may have a FWHM. The FWHM of the seventh peak may be from about 0.56°2θ to about 1.73°2θ. The FWHM of the seventh peak may be, for example, about 1.13°2θ. The eighth peak of the XRD pattern of the non-stoichiometric beta-delithiated layered nickel oxide may have a FWHM. The FWHM of the eighth peak may be from about 0.33°2θ to about 0.58°2θ. The FWHM of the eighth peak may be, for example, about 0.45°2θ.

Several of the peaks in the x-ray diffraction pattern of non-stoichiometric beta-delithiated layered nickel oxide have substantially larger FWHM values compared to other peaks in the diffraction pattern, for example the first, second, fifth, and seventh peaks. Without intending to be bound by theory, it is believed that the broadening of specific diffraction peaks in the x-ray diffraction pattern are the result of the formation of various deformation defects, for example, planar defects such as stacking faults, in the layered lattice structure that disrupt the long-range layer stacking sequence of the $NiO_2$ layers of the lithium nickel oxide precursor.

Figure 2:
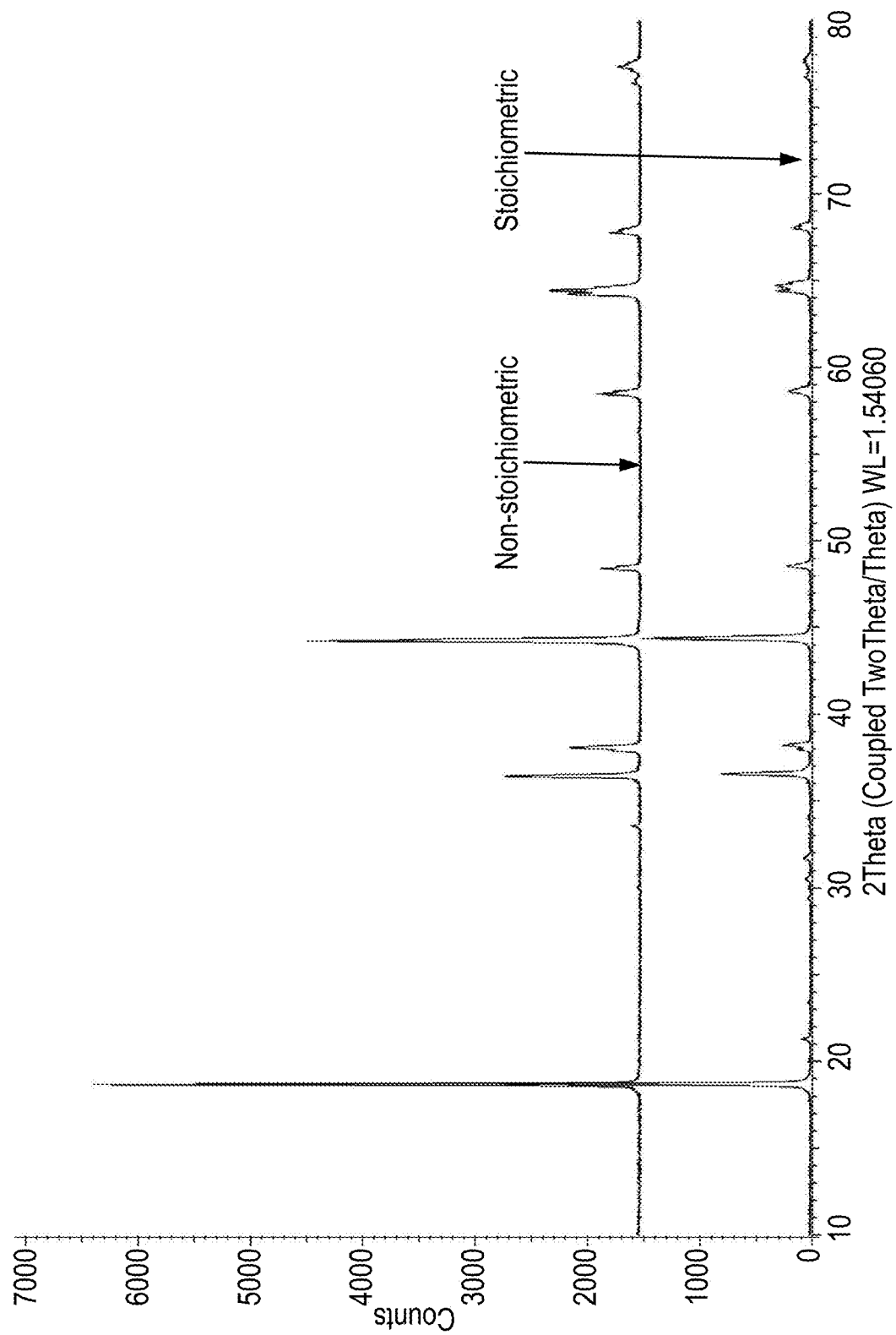
FIG. 2 includes a powder X-ray diffraction pattern for a stoichiometric lithium nickelate (lower) and a powder X-ray diffraction pattern for a non-stoichiometric lithium nickelate containing excess nickel (upper).
Figure 5:
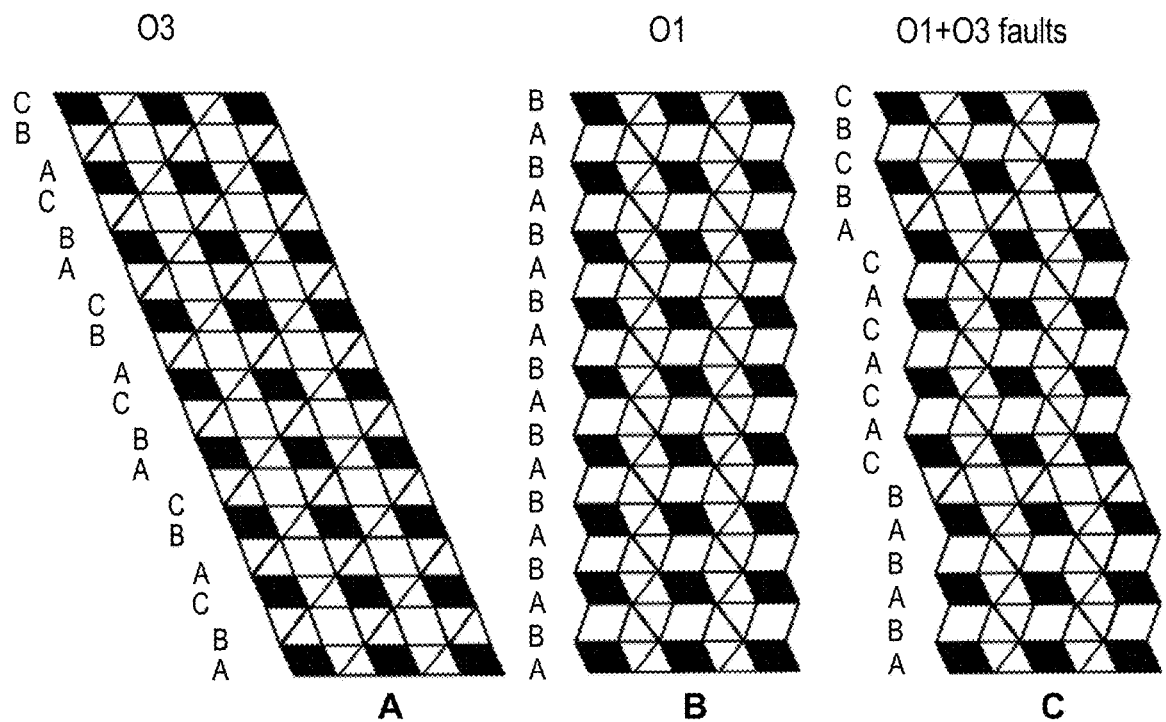
FIG. 5 is a rendering of: (A) a crystal lattice having an O3-type layer stacking sequence, (B) a crystal lattice having an O1-type layer stacking sequence, and (C) a crystal lattice having an O1-type stacking sequence with O3-type stacking faults statistically distributed throughout the lattice.

In the case of a nominally stoichiometric lithium nickel (III) oxide, $LiNiO_2$ (i.e., lithium nickelate), the lattice symmetry is rhombohedral and the crystal structure belongs to the R-3m space group. A nominally stoichiometric lithium nickel (III) oxide (lithium nickelate) having the general formula $LiNiO_2$ can be prepared by the procedure described by Arai et al. (Solid State Ionics 80 (1995) 261-269). Alternatively, stoichiometric lithium nickelate can be purchased from a commercial source (e.g., American Elements, Los Angeles, Calif.). The powder X-ray diffraction pattern for a nominally stoichiometric lithium nickelate, whether produced by Arai or secured commercially, is shown in FIG. 2. The lithium nickelate lattice structure is made up of stacks of $NiO_2$ layers having triangular symmetry and cubic close packing in the oxygen sublattice. The basic building block of the $NiO_2$ layer is a $NiO_6$ octahedron that shares its edges with other $NiO_6$ octahedra located in the same layer to form an extended edge-shared network. The lithium ions are located in octahedral sites, defined by the oxygen atoms, in the interlayer region between $NiO_2$ layers. The $NiO_2$ layers are systematically aligned relative to one another so as to form stacks of alternating $NiO_2$ layers and lithium-containing layers having long-range ordering. This type of long-range ordering can be classified as an O3-type layer stacking sequence in which the repeat unit includes three $NiO_2$ layers having AB CA BC oxygen packing, as depicted in FIG. 5A.

Figure 3:
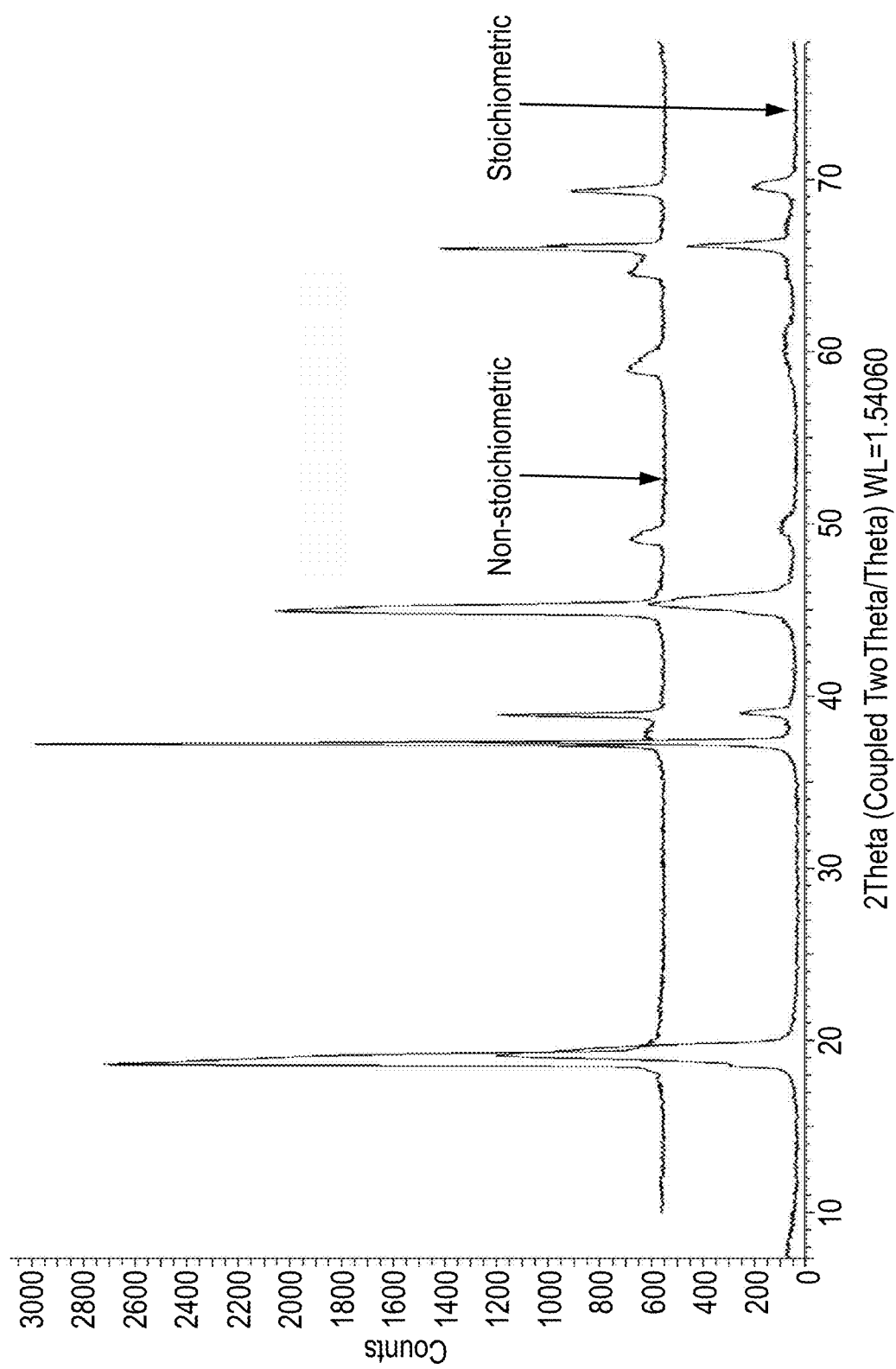
FIG. 3 includes a powder X-ray diffraction pattern for a stoichiometric alpha-delithiated layered nickel oxide (lower) and the powder X-ray diffraction pattern for a non-stoichiometric alpha-delithiated nickel oxide (upper).

As the nickel(III) of the stoichiometric lithium nickelate is oxidized to nickel(IV), lithium ions are de-intercalated in order to maintain overall charge electroneutrality without eliminating oxygen from the crystal lattice. Stoichiometric lithium nickelate can be delithiated by the general procedure described by Arai et al. (Electrochimica Acta 50 (2005) 1821-1828). The resulting Ni(IV) containing delithiated layered nickel oxide is referred to herein as alpha-delithiated layered nickel oxide, and nearly all of the lithium ions are removed from the interlayer regions, with typically only about 5 to 10% of the lithium (based on the total lithium in the lithium nickelate precursor) remaining. As lithium ions are removed from the interlayer of the lithium nickelate, the $NiO_2$ layers are able to glide more easily relative to one another and form different stacking sequences having lower energy in order to minimize electrostatic repulsion between nickel and oxygen ions in opposing $NiO_2$ layers. Displacement of two adjacent $NiO_2$ layers can occur as soon as some of the lithium ions have deintercalated from the interlayer space between them, resulting in a localized region of O1-type stacking in the majority O3-layer stacking sequence. As additional lithium ions deintercalate from the rest of the interlayer regions, additional layer gliding occurs. At nearly complete de-intercalation of lithium ions, the rest of the lattice can transform into an ordered hexagonal lattice having an ordered O1-type layer stacking sequence, in which the repeat unit is a single $NiO_2$ layer having AB oxygen packing as depicted in FIG. 5B. A typical XRD pattern for stoichiometric alpha-delithiated layered nickel oxide is shown in FIG. 3 (bottom). The XRD pattern of stoichiometric alpha-delithiated layered nickel oxide is similar to that of the corresponding stoichiometric lithium nickelate precursor with the expected shifting of peaks corresponding to a slight expansion of the interlayer spacing resulting from removal of most of the lithium ions and the consequent increase in electrostatic repulsion between the $NiO_2$ layers.

In the case of a non-stoichiometric lithium nickelate having the general formula $Li_{1-a}Ni_{1+a}O_2$, where $0.02 \leq a \leq 0.2$ the excess nickel may occupy lithium sites in the interlayer. The presence of excess nickel can be determined by ICP elemental analysis. The presence of nickel in lithium sites in the interlayer can also be detected through Rietveld refinement of the XRD pattern of the non-stoichiometric lithium nickelate. The XRD pattern of a non-stoichiometric lithium nickelate compared with that for a stoichiometric lithium nickelate is shown in FIG. 2.

Nickel ions present in the interlayer of the non-stoichiometric lithium nickelate precursor generally are present in the interlayer of the derived alpha-delithiated layered nickel oxide, and ultimately in the interlayer of the non-stoichiometric beta-delithiated layered nickel oxide. The oxidation state of nickel ions in the interlayer of the lithium nickelate is believed to be Ni(II) based on ionic radius constraints of the octahedral lithium site. Without intending to be bound by theory, it is believed that the presence of nickel in the interlayer stabilizes the O3-type layer stacking sequence by locally inhibiting gliding of the $NiO_2$ layers relative to one another because of strong Ni—O bonding between adjacent $NiO_2$ layers, even after nearly all of the lithium ions have de-intercalated. An example of an O1-type lattice with O3-type stacking faults is depicted in FIG. 5C. The atom fraction of Ni(II) ions present in the interlayer of alpha-delithiated layered nickel oxide ranges from about 0.03 to about 0.15 and the atom fraction of residual lithium ions present in the interlayer ranges from about 0.05 to 0.12.

The alpha-delithiated layered nickel oxide has a high electrochemical potential value and has been found to react with alkaline aqueous electrolyte solutions to generate oxygen gas via an oxygen evolution reaction (OER). In addition, the discharge capacities of batteries including such alpha-delithiated layered nickel oxide as the electrochemically active cathode material are typically decreased by self-discharge due to the OER. Evolution of oxygen gas during storage of a closed battery can produce an increase in the internal pressure resulting in electrolyte leakage or venting if the pressure is sufficiently high. In addition, consumption of water by the OER decreases the amount of water present inside the cell that is available for the electrochemical discharge reaction which consumes water and generates protons and hydroxide ions and thereby limits the accessible discharge capacity of the battery compared to the theoretical capacity. Alpha-delithiated layered nickel oxide can be stabilized to substantially decrease the rate of the OER and thereby increase the capacity retention after storage, by treating the alpha-delithiated layered nickel oxide with an alkali hydroxide solution. Treatment of the alpha-delithiated layered nickel oxide with an aqueous alkali hydroxide solution introduces alkali cations as well as water molecules into the interlayer of the alpha-delithiated nickel oxide structure.

When an alpha-delithiated layered nickel oxide having an atom fraction of about 0.03 to about 0.15 of Ni(II) in the interlayer (i.e., non-stoichiometric), relative to the total nickel content, is treated with an alkali hydroxide solution, the intercalation of alkali metal and water molecules into the interlayer results in additional stacking faults introduced into the structure of the non-stoichiometric alpha-delithiated layered nickel oxide. The material including the alkali metal and water, as well as other stacking faults is referred to as non-stoichiometric beta-delithiated layered nickel oxide. Without intending to be bound by theory, it is believed that during treatment with alkali hydroxide solution, the O3-type stacking sequence of the alpha-delithiated layered nickel oxide is converted to an ordered O1-type stacking sequence with O3-type layer stacking faults present in the bulk ordered O1-type lattice. In addition, during treatment with alkali hydroxide solution, alkali metal ions accompanied by water molecules may also intercalate into ordered O1-type lattice, forming another type of planar stacking fault comprising gamma-nickel oxyhydroxide-like layers (γ-NiOOH-like) having a larger spacing (e.g., 11-12 angstroms) between the $NiO_2$ layers, relative to the spacing of the O3-type layers and O1-type layers (about 4.7 angstrom and 7.2 angstrom, respectively). The γ-NiOOH-like stacking fault has a P3-type layer stacking sequence, wherein the repeat unit includes three $NiO_2$ layers having oxygen in an AB BC CA stacking order. It is further believed that nucleation of γ-NiOOH-like layers may occur near O3-type layer stacking faults, thereby providing structural stabilization by minimizing strain energy at the interface between the O3-type layer stacking faults and the ordered O1-type lattice. The characteristic XRD pattern for non-stoichiometric beta-delithiated layered nickel oxide is shown in FIG. 4. The presence of γ-NiOOH-like layer stacking faults is evidenced by the broad seventh peak appearing at about 11° to 12°2θ in the XRD pattern of non-stoichiometric beta-delithiated layered nickel oxide. Typical lattice parameters for the beta-delithiated layered nickel oxide were determined by refinement of the XRD pattern: a=2.839 Å, c=14.324 Å (space group: R-3m).

In contrast, when a nominally stoichiometric alpha-delithiated layered nickel oxide having an atom fraction of less than about 0.03, or less than about 0.02 of Ni(II) present in the interlayer relative to the total nickel content, is treated with an alkali hydroxide solution, the alpha-delithiated layered nickel oxide converts nearly completely to a highly crystalline form of gamma-nickel oxyhydroxide (γ-NiOOH), rather than to non-stoichiometric beta-delithiated layered nickel oxide. The powder XRD pattern of non-stoichiometric beta-delithiated stoichiometric beta-delithiated layered nickel oxide can be distinguished readily from that of gamma-nickel oxyhydroxide as shown in FIG. 4 (lower). The lower XRD pattern shown in FIG. 4 was obtained from a gamma-nickel oxyhydroxide prepared by following the synthetic methods described in Arai et al. (Electrochimica Acta, 50 (2005) 1821-1828; Solid State Ionics, 80 (1995) 261-269). This XRD pattern corresponds to the XRD pattern of the gamma-nickel oxyhydroxide material prepared by Arai (shown in FIG. 1e of Arai), confirming that the product of KOH treatment of delithiated lithium nickel oxide prepared from stoichiometric lithium nickel oxide is the same gamma-nickel oxyhydroxide material prepared by Arai et al. (Electrochimica Acta, 50 (2005) 1821-1828).

Surprisingly, non-stoichiometric beta-delithiated layered nickel oxide prepared from non-stoichiometric lithium nickelate was found to provide one or more advantages including, but not limited to, decreased rate of oxygen evolution, decreased self-discharge, and increased capacity retention when provided as an electrochemically active cathode material in an alkaline battery, relative to alpha-delithiated layered nickel oxide active material prepared from either stoichiometric or non-stoichiometric lithium nickelate. For example, a non-stoichiometric beta-delithiated layered nickel oxide has an oxygen evolution rate of about 50% or less of the oxygen evolution rate of the corresponding alpha-delithiated layered nickel oxide precursor when immersed in an alkaline KOH electrolyte solution as shown in Table 3. In contrast, non-stoichiometric lithium nickelate and the alpha- and beta-delithiated layered nickel oxide prepared therefrom are generally unsuitable for use as the cathode active material in a non-aqueous lithium-ion rechargeable battery. In particular, the presence of Ni(II) ions in the interlayer region of non-stoichiometric lithium nickelate and alpha- and beta-delithiated layered nickel oxide prepared therefrom, causes a decrease in the distance between the $NiO_2$ layers. Such a decrease in spacing can impede both rate and extent of lithium de-intercalation and re-intercalation, thereby limiting total discharge capacity and rate capability of a non-aqueous lithium-ion secondary battery.

Experimentally measured XRD patterns for non-stoichiometric beta-delithiated layered nickel oxide can be simulated using the DIFFaX computer program. The amount of O3-type layer stacking faults and gamma-NiOOH-like layer stacking faults present in an ordered O1-type layer stacking sequence can be varied statistically to estimate the relative amounts of each stacking type that must be present to achieve the relative intensity, peak shape, and FWHM values for each peak of the experimentally measured XRD pattern. The DIFFaX program calculates diffracted intensity versus 2θ for a given type of layer stacking sequence assuming a hypothetical stacking structure model. The XRD patterns can be simulated by introducing increasing levels of both O3-type layer stacking faults and gamma-nickel oxyhydroxide-like layers into an ordered O1-type oxygen packing model. Simulated diffraction patterns can be refined using Rietveld analysis to identify the faulting structure model providing the closest match with the experimental diffraction pattern. The transition probabilities for the O3-type and gamma-nickel oxyhydroxide-like faults used to generate the simulated diffraction pattern best matching the experimental diffraction pattern can be converted to stacking layer fractions.

Figure 6A:
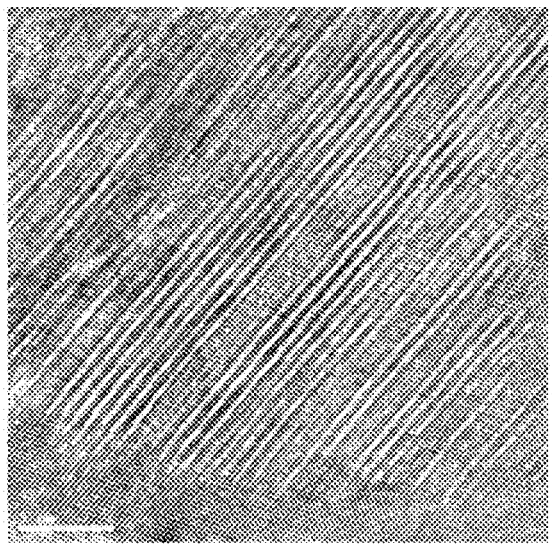
FIG. 6A includes a high resolution scanning transmission electron micrograph showing the presence of O3-type layer stacking faults in an ordered O1-type layer stacking sequence of non-stoichiometric beta-delithiated layered nickel oxide and FIG. 6B a convergent beam electron diffraction pattern showing the presence of O3-type layer stacking faults (4.7 Å) in an ordered O1-type stacking sequence (7.2 Å) of an embodiment of non-stoichiometric beta-delithiated layered nickel oxide.
Figure 6B:
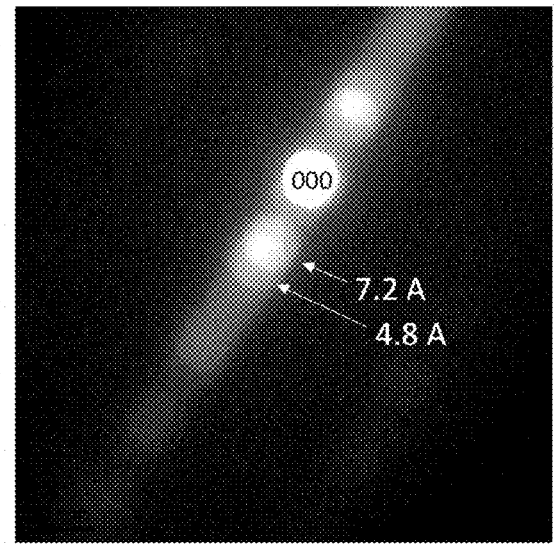

Scanning transmission electron microscope (STEM) imaging, for example, as shown in FIG. 6A, and convergent beam electron diffraction (CBED) of individual crystallites, for example, as shown in FIG. 6B, can be used to readily detect the presence of localized stacking faults in a bulk phase having a characteristic layer stacking sequence. Specifically, CBED measurement and STEM lattice imaging of individual crystallites in non-stoichiometric beta-delithiated layered nickel oxide particles can reveal the presence of low levels of a second (and third) layer stacking sequence as a stacking fault in the majority stacking sequence in the layered structure of the bulk phase. Stacking faults are evident in the STEM lattice images as abrupt changes in the periodicity of lattice fringes and also as changes in the corresponding row spacing of spots in the electron diffraction pattern. In the case of non-stoichiometric lithium nickelate, the presence of extra spots (relative to nominally stoichiometric lithium nickelate) along the c-axis direction is consistent with the presence of Ni ions in the interlayer regions with different ordering along the c-axis. In the case of non-stoichiometric beta-delithiated layered nickel oxide, there is evidence for the presence of an ordered O1-type stacking sequence having a row spacing of 7.2 angstroms as well as the presence of regions having 4.7 angstroms row spacing corresponding to O3-type layer stacking faults. Further, the O3-type faults can be either scattered or clustered together in the O1-type lattice.

Figure 7A:
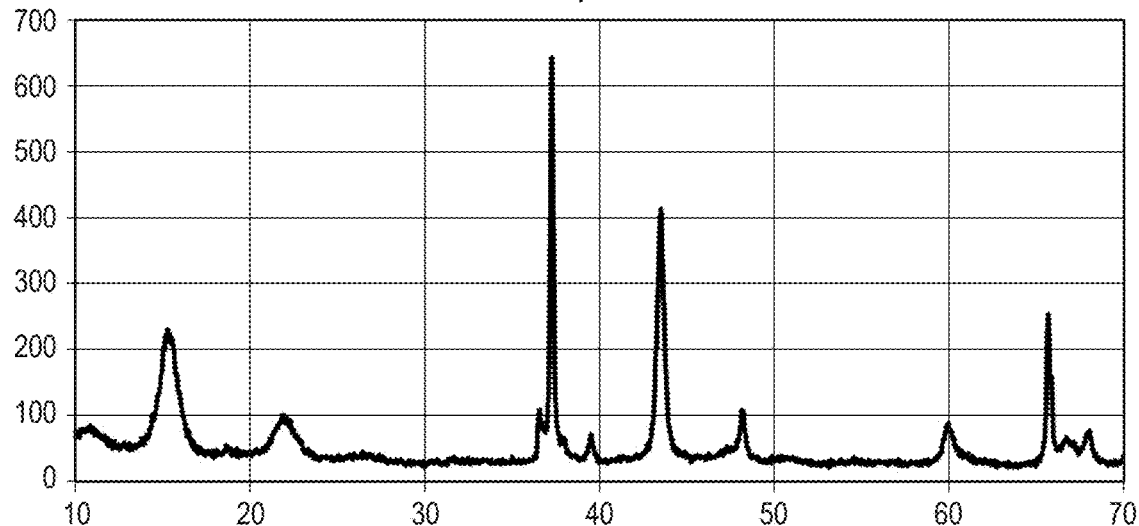
FIG. 7 includes in (A) a powder X-ray diffraction pattern for an embodiment of a beta-delithiated layered nickel oxide and in (B) the corresponding simulated X-ray diffraction pattern calculated by DIFFaX software assuming a statistical distribution of a combination of O3-type and P3-type (i.e., γ-NiOOH-type) stacking faults in a lattice having an ordered O1-type layer stacking sequence.
Figure 7B:
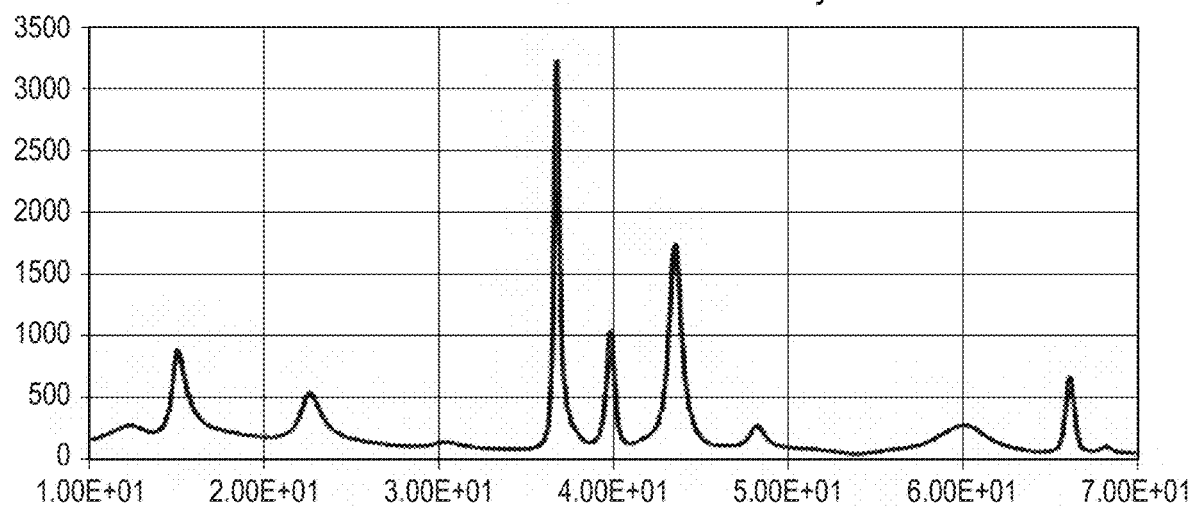

A simulated XRD pattern for a non-stoichiometric beta-delithiated layered nickel oxide generated by the DIFFaX program is depicted in FIG. 7B and can be compared with the corresponding experimentally measured XRD pattern in FIG. 7A. As described above, the simulated XRD pattern can be used to determine the stacking layer fractions. The non-stoichiometric beta-delithiated layered nickel oxide has a layered structure characterized by a lattice comprising a plurality of $NiO_2$ layers, wherein the $NiO_2$ lattice comprises an ordered O1-type layer stacking sequence, at least one of an O3-type type layer stacking fault and at least one of a gamma-nickel oxyhydroxide-like layer stacking fault. The values for the layer fractions of ordered O1-type, O3-type, and gamma-nickel oxyhydroxide-type stacking in the lattice structure of a non-stoichiometric beta-delithiated layered nickel oxide providing high discharge capacities in alkaline electrochemical cells can have characteristic ranges. In particular, the $NiO_2$ lattice can comprise about 60% to about 95% ordered O1-type layer stacking, for example, about 65% to about 95%, about 60% to about 85%, about 70% to about 90%, about 85% to about 95%, about 75% to about 90%, about 80% to 90%, or about 84% to 88% ordered O1-type layer stacking, based on the total layers, as determined using the DIFFaX program. The $NiO_2$ lattice of the non-stoichiometric beta-delithiated layered nickel oxide can comprise about 2% to about 40% O3-type layer stacking faults, for example, about 2% to about 35%, about 2% to about 15%, about 2% to about 10%, about 4% to about 30%, about 4% to about 25%, about 6% to about 20%, about 6% to about 15%, about 7% to about 12%, about 7% to about 11%, about 15% to about 40%, about 25% to about 40%, or about 35% to about 40% O3-type layer stacking faults, based on the total layers, as determined using the DIFFaX program. The $NiO_2$ lattice of the non-stoichiometric beta-delithiated layered nickel oxide can comprise about 2% to about 5% γ-NiOOH-like layer stacking faults, for example, about 2%, about 3%, about 4%, or about 5% γ-NiOOH-like layer stacking faults, based on the total layers, as determined using the DIFFaX program. The characteristic faulting structure of non-stoichiometric beta-delithiated layered nickel oxide can be effectively defined by the amount of Ni(II) ions in the lithium layer and the ranges for stacking fault fractions of the O1-type layer stacking sequence, O3-type layer stacking faults, and gamma-nickel oxyhydroxide-like layer stacking faults statistically distributed in the crystal lattice.

Thus, a method for identifying and characterizing a non-stoichiometric beta-delithiated layered nickel oxide capable of providing high discharge capacity when included in the cathode of primary alkaline batteries includes the analysis of the x-ray diffraction and electron diffraction data using the DIFFaX program to simulate the experimental diffraction patterns employing a structure model. A structure model can be developed to characterize the ordered layer stacking sequence or sequences and planar faults present in the non-stoichiometric beta-delithiated layered nickel oxide to determine if the beta-delithiated layered nickel oxide comprises an ordered O1-type layer stacking sequence, at least one of an O3-type layer stacking fault and at least one of a gamma-nickel oxyhydroxide-like layer stacking fault, for example, from about 60 to about 95% ordered O1-type layer stacking sequence, about 2 to about 40% O3-type layer stacking faults, and about 2 to about 5% gamma-nickel oxyhydroxide-like layer stacking faults.

Non-stoichiometric beta-delithiated layered nickel oxide can be prepared from a non-stoichiometric alpha-delithiated layered nickel oxide that was prepared in turn from a non-stoichiometric lithium nickelate.

The non-stoichiometric lithium nickelate precursor can have a formula $Li_{1-a}Ni_{1+a}O_2$, wherein 0.02≤a<0.2. The lithium nickelate can be doped with a metal, M, selected from an alkaline earth metal, a transition metal, a non-transition metal and any combination thereof. The metal doped lithium nickelate can have a formula $Li_{1-a}Ni_{1+a-z}M_zO_2$ wherein 0.02≤a<0.2 and 0≤z<0.2. Without intending to be bound by theory, it is believed that when a non-stoichiometric lithium nickelate having M in an amount greater than or equal to 20% of the amount of nickel is used as a starting material for non-stoichiometric alpha-delithiated layered nickel oxide, treatment of the resulting nonstoichiometric alpha-delithiated layered nickel oxide with alkaline solution will not form non-stoichiometric beta-delithiated layered nickel oxide, but will instead form gamma-nickel oxyhydroxide. Further, it is believed that when the lithium nickelate is a stoichiometric lithium nickelate (i.e., $Li_{1-a}Ni_{1+a}O_2$, wherein $0 \le a < 0.02$), treatment of the alpha-delithiated layered nickel oxide prepared therefrom with alkaline solution will form gamma-nickel oxyhydroxide rather than the non-stoichiometric beta-delithiated layered nickel oxide.

Non-stoichiometric alpha-delithiated layered nickel oxide comprises a chemical formula $Li_xH_wNi_{1-a}O_2$, wherein $0.02 \le x \le 0.2$, $0 \le w \le 0.2$, and $0.02 \le a \le 0.2$. Methods of forming non-stoichiometric alpha-delithiated layered nickel oxides are well known in the art. A non-stoichiometric lithium nickelate can be chemically oxidized to form a non-stoichiometric alpha-delithiated layered nickel oxide. Suitable chemical oxidants for forming alpha-delithiated layered nickel oxide from lithium nickelate include, but are not limited to, sodium hypochlorite, sodium peroxydisulfate, potassium peroxydisulfate, ammonium peroxydisulfate, sodium permanganate, potassium permanganate, sodium dichromate, potassium dichromate, ozone gas, chlorine gas, bromine gas, sulfuric acid, hydrochloric acid, and nitric acid. The alpha-delithiated layered nickel oxide can further include a metal, M, selected from an alkaline earth metal, a transition metal, a non-transition metal, and any combination thereof. An non-stoichiometric alpha-delithiated layered nickel oxide including a metal dopant, M, can be prepared from a metal doped non-stoichiometric lithium nickelate precursor. Additionally, the interlayer region of the alpha-delithiated layered nickel oxide contains nearly the same atom fraction of Ni(II) ions as in the interlayer region of the lithium nickelate precursor.

In the case of treating lithium nickelate with a strong mineral acid, Ni(III) ions undergo an acid-promoted disproportionation reaction resulting in the formation of equal portions of soluble Ni(II) and insoluble Ni(IV). This disproportionation reaction can be summarized as follows in Equation 1:

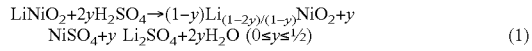

$$LiNiO_2 + 2yH_2SO_4 \rightarrow (1-y)Li_{(1-2y)/(1-y)}NiO_2 + y\,NiSO_4 + y\,Li_2SO_4 + 2yH_2O \quad (0 \le y \le \tfrac{1}{2}) \qquad (1)$$

The Ni(II) species are soluble and dissolve in the aqueous acid solution while the Ni(IV) species are insoluble and remain to preserve the layered crystal lattice structure.

The non-stoichiometric beta-delithiated layered nickel oxide comprises a chemical formula $Li_xA_yNi_{1+a-z}M_zO_2 \cdot nH_2O$ wherein x is from about 0.02 to about 0.20; y is from about 0.03 to about 0.20; a is from about 0.02 to about 0.2; z is from about 0 to about 0.2; n is from about 0 to about 1; A comprises an alkali metal comprising potassium, rubidium, cesium, and any combination thereof; and M comprises an alkaline earth metal, a transition metal, a non-transition metal, and any combination thereof. The non-stoichiometric beta-delithiated layered nickel oxide is prepared via treatment of non-stoichiometric alpha-delithiated layered nickel oxide with an alkaline solution containing an alkali metal salt. The alkaline solution is not particularly limited and can be selected from a potassium salt solution, a rubidium salt solution, a cesium salt solution, or any combination thereof. The alkaline solution can be prepared from an alkali salt and water, for example, an alkali hydroxide solution. The concentration of alkali salt in the alkaline solution must sufficient to achieve complete conversion of the alpha-delithiated layered nickel oxide to the non-stoichiometric beta-delithiated layered nickel oxide. In some embodiments, the concentration of alkali salt in the solution can be in a range of about 0.5M to about 10M. In some embodiments, the alkaline solution includes at least one of potassium hydroxide, cesium hydroxide and rubidium hydroxide, provided at a concentration of about 0.5M to about 10M. The non-stoichiometric alpha-delithiated layered nickel oxide can be provided as a free-flowing powder. The non-stoichiometric alpha-delithiated layered nickel oxide powder and alkaline solution can be combined in a weight ratio of about 5:1 to about 1:2, or about 4:1 to about 1:2, or about 3:1 to about 1:1, for example, about 3:1, about 2:1, or about 1:1.

The non-stoichiometric alpha-delithiated layered nickel oxide can be treated with the alkaline solution for a period of time sufficient to ensure that the non-stoichiometric alpha-delithiated layered nickel oxide is fully converted to the non-stoichiometric beta-delithiated layered nickel oxide. The non-stoichiometric alpha-delithiated layered nickel oxide and alkaline solution can be agitated initially for 5 to 15 minutes at ambient temperature to ensure adequate mixing and wetting. Following mixing of the non-stoichiometric alpha-delithiated layered nickel oxide and the alkaline solution, the mixture is held at ambient temperature for 2 to 24 hours. Optionally, the mixture can be stirred during the 2 to 24 hour period. Complete conversion to the non-stoichiometric beta-delithiated layered nickel oxide can be determined by analyzing the powder X-ray diffraction pattern. For example, as the non-stoichiometric alpha-delithiated layered nickel oxide converts to non-stoichiometric beta-delithiated nickel oxide, the peak at about 18° to 20°2θ in the non-stoichiometric alpha-delithiated layered nickel oxide X-ray diffraction pattern decreases in intensity and very broad peaks grow in the non-stoichiometric beta-delithiated layered nickel oxide X-ray diffraction pattern at about 14.9° to about 16.0°2θ and about 21.3° to about 22.7°2θ. Thus, at full conversion to non-stoichiometric beta-delithiated nickel oxide, the powder X-ray diffraction pattern will have broad peaks at about 10.8° to about 12.0°2θ, about 14.9° to about 16.0°2θ, and about 31.3° to about 22.7°2θ having greater intensities than in the powder X-ray diffraction pattern of non-stoichiometric alpha-delithiated layered nickel oxide precursor, and there will be no peak having significant intensity in the range of about 18° to 20°2θ. The resulting non-stoichiometric beta-delithiated layered nickel oxide can be washed repeatedly with deionized water until the pH of the filtrate from washing is about 10. The solid powder can be collected and dried in air at about 70° C. for a period of about 12 to 20 hours.

In an alkaline battery, the electrochemically active cathode material is reduced during discharge and water from the alkaline electrolyte within the battery is simultaneously consumed. This results in the formation of hydroxide ions and the insertion of protons into the structure of the electrochemically active cathode material. For example, a conventional alkaline battery may include electrolytic manganese dioxide (EMD) as the electrochemically active cathode material. In such a conventional alkaline battery, one mole of water may be consumed for each mole of manganese present in the 4+ oxidation state that may be reduced to manganese in the 3+ oxidation state by a 1-electron reduction process. A non-conventional alkaline battery, for example, may include non-stoichiometric beta-delithiated layered nickel oxide as the electrochemically active cathode material. The non-stoichiometric beta-delithiated layered nickel oxide may, for example, have the chemical formula $Li_{0.07}K_{0.13}Ni_{1.11}O_2 \cdot 0.63H_2O$. In such a non-conventional alkaline battery, up to two moles of water may be consumed for each mole of nickel present in the 4+ oxidation state that may be reduced to nickel in the 230 oxidation state by a 2-electron reduction process. In addition, one mole of water may be consumed for each mole of nickel present in the 3+ oxidation state that may be reduced to nickel in the 2+ oxidation state by a one-electron reduction process. Thus, the electrochemical discharge of a battery containing the beta-delithiated layered nickel oxide may require more than one mole of water per mole of nickel in order to achieve complete discharge. In addition, an excess amount of water may be required to minimize polarization of the anode during discharge and compensate for water consumed by self-discharge during storage of the battery. The amount of excess water that may be required depends on the specific chemical composition of the non-stoichiometric beta-delithiated layered nickel oxide and the relative amounts of nickel in the 4+ and 3+ oxidation states. Water may be introduced into the battery via the aqueous alkaline electrolyte solution and as moisture content of the non-stoichiometric beta-delithiated layered nickel oxide. The alkaline electrolyte may be distributed throughout the battery. The total amount of water present in the battery may be increased by various methods. For example, the amount of water may be increased by increasing the total amount of alkaline electrolyte added to the battery. Further, the amount of water in the battery may be increased by decreasing the potassium hydroxide concentration of the electrolyte solution. In contrast, in conventional alkaline batteries it is desirable to add the smallest total volume of electrolyte to the battery in order to maximize the internal volume available for the electrochemically active electrode materials.

The cathode 12 can include non-stoichiometric beta-delithiated layered nickel oxide as an electrochemically active cathode material. As used herein, "non-stoichiometric beta-delithiated layered nickel oxide" refers to a non-stoichiometric delithiated layered nickel oxide that is isolated in the "beta" form. Therefore, for example, when a non-stoichiometric beta-delithiated layered nickel oxide is provided as a electrochemically active cathode material, the non-stoichiometric beta-delithiated layered nickel oxide comprises less than 5 wt. %, less than 3 wt %, less than 1 wt %, or less than 0.5 wt % residual non-stoichiometric alpha-delithiated layered nickel oxide, based on the total weight of the delithiated layered nickel oxide electrochemically active cathode material. Similarly, a cell that includes a non-stoichiometric beta-delithiated layered nickel oxide, as described herein, is provided with the non-stoichiometric beta-delithiated layered nickel oxide ab initio.

The cathode 12 may also include at least one or more additional electrochemically active cathode materials. The additional electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, and any combination thereof. Other electrochemically active cathode materials include, but are not limited to, silver oxide; nickel oxide, nickel oxyhydroxide; copper oxide; silver copper oxide; silver nickel oxide; bismuth oxide; oxygen; and any combination thereof. The nickel oxyhydroxide can include beta-nickel oxyhydroxide, gamma-nickel oxyhydroxide, intergrowths of beta-nickel oxyhydroxide and/or gamma-nickel oxyhydroxide, and cobalt oxyhydroxide-coated nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide.

In embodiments, the electrochemically active material of cathode 12 comprises at least 10 wt. % non-stoichiometric beta-delithiated layered nickel oxide having the general formula $Li_xA_yNi_{1+a-z}M_zO_2 \cdot nH_2O$ where x is from about 0.03 to about 0.12; y is from about 0.03 to about 0.20; a is from about 0.02 to about 0.2; z is from about 0 to about 0.2; n is from about 0 to about 1; A comprises an alkali metal; and M comprises an alkaline earth metal, a transition metal, a non-transition metal, and any combination thereof, based on the total weight of the electrochemically active cathode material, and the balance of the electrochemically active cathode material comprises one or more of manganese oxide, manganese dioxide, electrolytic manganese dioxide (EMD), chemical manganese dioxide (CMD), high power electrolytic manganese dioxide (HP EMD), lambda manganese dioxide, or gamma manganese dioxide. In embodiments, the electrochemically active material of cathode 12 comprises at least 10 wt. %, at least 15 wt. %, at least 20 wt. %, at least 25. wt %, at least 30 wt. %, at least 35 wt. %, at least 40 wt. %, at least 45 wt. %, at least 50 wt. %. at least 55 wt. %, at least 60 wt. %, at least about 70 wt. %, or at least about 75 wt. %, of the non-stoichiometric beta-delithiated layered nickel oxide, based on the total weight of the electrochemically active cathode material, for example, in a range of about 10 wt. % to about 90 wt. %, about 10 wt. % to about 80 wt. %, about 20 wt. % to about 70 wt. %, about 30 wt. % to about 60 wt. %, about 40 wt. % to about 60 wt. %, or about 50 wt. %, based on the total weight of the electrochemically active cathode material. In embodiments, the electrochemically active material of cathode 12 comprises about 40 wt. % to about 60 wt. % of the non-stoichiometric beta-delithiated nickel oxide, based on the total weight of the electrochemically active cathode material and about 60 wt. % to about 40 wt. % of one or more of manganese oxide, manganese dioxide, electrolytic manganese dioxide (EMD), chemical manganese dioxide (CMD), high power electrolytic manganese dioxide (HP EMD), lambda manganese dioxide, or gamma manganese dioxide, based on the total weight of the electrochemically active cathode material. A combination of between about 10 wt. % and about 60 wt. %, for example, 20 wt. % or 50 wt. %, of the non-stoichiometric beta-delithiated layered nickel oxide with the balance of the electrochemically active cathode material comprising electrolytic manganese dioxide (EMD) has been found to provide unexpectedly advantageous battery performance in both high discharge rate applications and low rate discharge applications.

The cathode 12 may include a conductive additive, such as carbon, and optionally, a binder. The cathode 12 may also include other additives. The carbon may increase the conductivity of the cathode 12 by facilitating electron transport within the solid structure of the cathode 12. The carbon may be graphite, such as natural graphite, synthetic graphite, oxidation resistant graphite, graphene, single-walled carbon nanotubes, multi-walled carbon nanotubes, carbon fibers, carbon nanofibers, carbon nanoribbons, carbon nanoplatelets, and mixtures thereof. It is preferred that the amount of carbon in the cathode is relatively low, e.g., less than about 12%, less than about 10%, less than about 9%, less than about 8%, less than about 6%, less than about 5% less than about 3.75%, or even less than about 3.5%, for example from about 3.0% to about 5% by weight or from about 2.0% to about 3.5% by weight. The lower carbon level can enable inclusion of a higher loading of electrochemically active cathode material within the cathode 12 without increasing the volume of the cathode 12 or reducing the void volume (which must be maintained at or above a certain level to prevent internal pressure from rising too high as gas is generated within the cell) within the battery 10. Suitable graphite for use within a battery, e.g., within the cathode, may be, for example, Timrex MX-15, SFG-15, MX-25, all available from Imerys Graphite and Carbon (Bodio, Switzerland). In the case of a highly reactive cathode active material such as non-stoichiometric beta-delithiated layered nickel oxide, an oxidation-resistant graphite, for example, SFG-15, SFG-10, and SFG-6, can be used.

The cathode 12 can include an optional binder. As used herein, "binder" refers to a polymeric material that provides cathode cohesion and does not encompass graphite. Examples of optional binders that may be used in the cathode 12 include polyethylene, polyacrylic acid, or a fluorocarbon resin, such as PVDF or PTFE. An optional binder for use within the cathode 12 may be, for example, COATHYLENE HA-1681, available from E. I. du Pont de Nemours and Company (Wilmington, Del., USA). Examples of other cathode additives are described in, for example, U.S. Pat. Nos. 5,698,315, 5,919,598, 5,997,775 and 7,351,499. In some embodiments, the cathode 12 is substantially free of a binder. As used herein, "substantially free of a binder" means that the cathode includes less than about 5 wt. %, less than about 3 wt. %, or less than about 1 wt. % of a binder.

The content of electrochemically active cathode material within the cathode 12 may be referred to as the cathode loading. The loading of the cathode 12 may vary depending upon the electrochemically active cathode material used within, and the size of, the battery 10. For example, a AA battery with a beta-delithiated layered nickel oxide as the electrochemically active cathode material may have a cathode loading of at least about 6 grams of beta-delithiated layered nickel oxide. The cathode loading may be, for example, at least about 7 grams of non-stoichiometric beta-delithiated layered nickel oxide. The cathode loading may be, for example, between about 7.2 grams to about 11.5 grams of non-stoichiometric beta-delithiated layered nickel oxide. The cathode loading may be from about 8 grams to about 10 grams of non-stoichiometric beta-delithiated layered nickel oxide. The cathode loading may be from about 8.5 grams to about 9.5 grams of non-stoichiometric beta-delithiated layered nickel oxide. The cathode loading may be from about 9.5 grams to about 11.5 grams of non-stoichiometric beta-delithiated layered nickel oxide. The cathode loading may be from about 10.4 grams to about 11.5 grams of non-stoichiometric beta-delithiated layered nickel oxide. For a AAA battery, the cathode loading may be at least about 3 grams of non-stoichiometric beta-delithiated layered nickel oxide electrochemically active cathode material. The cathode loading may be from about 3 grams to about 5 grams of non-stoichiometric beta-delithiated layered nickel oxide. The cathode loading may be from about 3.5 grams to about 4.5 grams of non-stoichiometric beta-delithiated layered nickel oxide. The cathode loading may be from about 3.9 grams to about 4.3 grams of non-stoichiometric beta-delithiated layered nickel oxide. For a AAAA battery, the cathode loading may be from about 1.5 grams to about 2.5 grams of non-stoichiometric beta-delithiated layered nickel oxide electrochemically active cathode material. For a C battery, the cathode loading may be from about 27.0 grams to about 40.0 grams, for example about 33.5 grams, of non-stoichiometric beta-delithiated layered nickel oxide electrochemically active cathode material. For a D battery, the cathode loading may be from about 60.0 grams to about 84.0 grams, for example about 72.0 grams, of non-stoichiometric beta-delithiated layered nickel oxide electrochemically active cathode material.

The cathode components, such as active cathode material(s), carbon particles, binder, and any other additives, may be combined with a liquid, such as an aqueous potassium hydroxide electrolyte, blended, and pressed into pellets for use in the assembly of the battery 10. For optimal cathode pellet processing, it is generally preferred that the cathode pellet have a moisture level in the range of about 2% to about 5% by weight, or about 2.8% to about 4.6% by weight. The pellets, are placed within the housing 18 during the assembly of the battery 10, and are typically re-compacted to form a uniform cathode assembly within the housing 18. The cathode pellet may have a cylindrical shape that includes a central bore. The size of the pellet may vary by the size of the battery, for example AA size, AAA size, AAAA size, C size, and D size, that the pellet will be used within. The central bore may define an inside diameter (ID) of the pellet. The inside diameter of the pellet for a AA battery may be, for example, from about 9.1 mm to about 9.9 mm. The inside diameter of the pellet for a AA battery may be, for example, from about 9.3 mm to about 9.7 mm. The inside diameter of the pellet for a AAA battery may be, for example, from about 6.6 mm to about 7.2 mm. The inside diameter of the pellet for a AAA battery may be, for example, from about 6.7 mm to about 7.1 mm. The inside diameter of the pellet for a AAAA battery may be, for example, from about 5 mm to about 5.5 mm. The inside diameter of the pellet for a C battery may be, for example, from about 16 mm to about 19 mm. The inside diameter of the pellet for a D battery may be, for example, from about 21 mm to about 25 mm.

The cathode 12 will have a porosity that may be calculated at the time of cathode manufacture. The porosity of the cathode 12 may be from about 20% to about 40%, between about 22% and about 35%, and, for example, about 26%. The porosity of the cathode 12 may be calculated at the time of manufacturing, for example after cathode pellet processing, since the porosity of the cathode 12 within the battery 10 may change over time due to, inter alia, cathode swelling associated with electrolyte wetting of the cathode and discharge of the battery 10. The porosity of the cathode 12 may be calculated as follows. The true density of each solid cathode component may be taken from a reference book, for example Lange's Handbook of Chemistry (16th ed. 2005). The solids weight of each of the cathode components are defined by the battery design. The solids weight of each cathode component may be divided by the true density of each cathode component to determine the cathode solids volume. The volume occupied by the cathode 12 within the battery 10 is defined, again, by the battery design. The volume occupied by the cathode 12 may be calculated by a computer-aided design (CAD) program. The porosity may be determined by the following formula:

Cathode Porosity=[1−(cathode solids volume÷cathode volume)]×100

For example, the cathode 12 of a AA battery may include about 9.0 grams of non-stoichiometric beta-delithiated layered nickel oxide and about 0.90 grams of graphite (BNC-30) as solids within the cathode 12. The true densities of the non-stoichiometric beta-delithiated layered nickel oxide and graphite may be, respectively, about 4.9 g/cm$^3$ and about 2.15 g/cm$^3$. Dividing the weight of the solids by the respective true densities yields a volume occupied by the non-stoichiometric beta-delithiated layered nickel oxide of about 1.8 cm$^3$ and a volume occupied by the graphite of about 0.42 cm$^3$. The total solids volume is about 2.2 cm$^3$. The battery designer may select the volume occupied by the cathode 12 to be about 3.06 cm$^3$. Calculating the cathode porosity per the equation above [1−(2.2 cm$^3$÷3.06 cm$^3$)] yields a cathode porosity of about 0.28, or 28%.

The anode 14 can be formed of at least one electrochemically active anode material, a gelling agent, and minor amounts of additives, such as organic and/or inorganic gassing inhibitor. The electrochemically active anode material may include zinc; zinc oxide; zinc hydroxide; metal hydride, such as AB$_5$(H), AB$_2$(H), and A$_2$B$_7$(H); alloys thereof; and any combination thereof.

The content of electrochemically active anode material within the anode 14 may be referred to as the anode loading. The loading of the anode 14 may vary depending upon the electrochemically active anode material used within, and the size of, the battery. For example, a AA battery with a zinc electrochemically active anode material may have an anode loading of at least about 3.3 grams of zinc. The anode loading may be, for example, at least about 3.5 grams, about 3.7 grams, about 3.9 grams, about 4.1 grams, about 4.3 grams, or about 4.5 grams of zinc. The anode loading may be from about 4.0 grams to about 5.5 grams of zinc. The anode loading may be from about 4.2 grams to about 5.3 grams of zinc. For example, a AAA battery with a zinc electrochemically active anode material may have an anode loading of at least about 1.8 grams of zinc. For example, the anode loading may be from about 1.8 grams to about 2.5 grams of zinc. The anode loading may be, for example, from about 1.9 grams to about 2.4 grams of zinc. For example, a AAAA battery with a zinc electrochemically active anode material may have an anode loading of at least about 0.6 grams of zinc. For example, the anode loading may be from about 0.7 grams to about 1.3 grams of zinc. For example, a C battery with a zinc electrochemically active anode material may have an anode loading of at least about 9.3 grams of zinc. For example, the anode loading may be from about 10.0 grams to about 19.0 grams of zinc. For example, a D battery with a zinc electrochemically active anode material may have an anode loading of at least about 30.0 grams of zinc. For example, the anode loading may be from about 30.0 grams to about 45.0 grams of zinc. The anode loading may be, for example, from about 33.0 grams to about 39.5 grams of zinc.

Examples of a gelling agent that may be used within the anode 14 include a polyacrylic acid; a polyacrylic acid cross-linked with polyalkenyl ether of divinyl glycol; a grafted starch material; a salt of a polyacrylic acid; a carboxymethylcellulose; a salt of a carboxymethylcellulose (e.g., sodium carboxymethylcellulose); or combinations thereof. The anode 14 may include a gassing inhibitor that may include an inorganic material, such as bismuth, tin, or indium. Alternatively, the gassing inhibitor can include an organic compound, such as a phosphate ester, an ionic surfactant or a nonionic surfactant. The electrolyte may be dispersed throughout the cathode 12, the anode 14, and the separator 16. The electrolyte comprises an ionically conductive component in an aqueous solution. The ionically conductive component may be an alkali hydroxide. The hydroxide may be, for example, potassium hydroxide, cesium hydroxide, and any combination thereof. The concentration of the ionically conductive component may be selected depending on the battery design and its desired performance. An aqueous alkaline electrolyte may include a hydroxide, as the ionically conductive component, in a solution with water. The concentration of the alkali hydroxide within the electrolyte may be from about 0.20 to about 0.40, or from about 20% to about 40%, on a weight basis of the total electrolyte within the battery 10. For example, the hydroxide concentration of the electrolyte may be from about 0.25 to about 0.32, or from about 25% to about 32%, on a weight basis of the total electrolyte within the battery 10. The aqueous alkaline electrolyte may also include zinc oxide (ZnO). The ZnO may serve to suppress zinc corrosion within the anode. The concentration of ZnO included within the electrolyte may be less than about 5% by weight of the total electrolyte within the battery 10. The ZnO concentration, for example, may be from about 1% by weight to about 3% by weight of the total electrolyte within the battery 10.

The total weight of the aqueous alkaline electrolyte within a AA alkaline battery, for example, may be from about 3.0 grams to about 4.4 grams. The total weight of the alkaline electrolyte within a AA battery may be, for example, from about 3.3 grams to about 3.8 grams. The total weight of the alkaline electrolyte within a AA battery may be, for example, from about 3.4 grams to about 3.65 grams. The total weight of the aqueous alkaline electrolyte within a AAA alkaline battery, for example, may be from about 1.0 grams to about 2.0 grams. The total weight of the electrolyte within a AAA battery may be, for example, from about 1.2 grams to about 1.8 grams. The total weight of the electrolyte within a AAA battery may be, for example, from about 1.4 grams to about 1.8 grams. The total weight of the electrolyte within a AAAA battery may be from about 0.68 grams to about 1 gram, for example, from about 0.85 grams to about 0.95 grams. The total weight of the electrolyte within a C battery may be from about 11 grams to about 14 grams, for example, from about 12.6 grams to about 13.6 grams. The total weight of the electrolyte within a D battery may be from about 22 grams to about 30 grams, for example, from about 24 grams to about 29 grams.

The separator 16 comprises a material that is wettable or wetted by the electrolyte. A material is said to be wetted by a liquid when the contact angle between the liquid and the surface of the material is less than 90° or when the liquid tends to spread spontaneously across the surface of the material; both conditions normally coexist. The separator 16 may comprise a single layer, or multiple layers, of woven or nonwoven paper or fabric. The separator 16 may include a layer of, for example, cellophane combined with a layer of non-woven material. The separator 16 also can include an additional layer of non-woven material. The separator 16 may also be formed in situ within the battery 10. U.S. Pat. No. 6,514,637, for example, discloses such separator materials, and potentially suitable methods of their application. The separator material may be thin. The separator 16, for example, may have a dry material thickness of less than 250 micrometers (microns). The separator 16 may have a dry material thickness from about 50 microns to about 175 microns. The separator 16 may have a dry material thickness from about 70 microns to about 160 microns. The separator 16 may have a basis weight of about 40 g/m$^2$ or 20 less. The separator 16 may have a basis weight from about 15 g/m$^2$ to about 40 g/m$^2$. The separator 16 may have a basis weight from about 20 g/m$^2$ to about 30 g/m$^2$. The separator 16 may have an air permeability value. The separator 16 may have an air permeability value as defined in International Organization for Standardization (ISO) Standard 2965. The air permeability value of the separator 16 may be from about 2000 cm$^3$/cm$^2$·min @ 1 kPa to about 5000 cm$^3$/cm$^2$·min @ 1 kPa. The air permeability value of the separator 16 may be from about 3000 cm$^3$/cm$^2$·min @ 1 kPa to about 4000 cm$^3$/cm$^2$·min @ 1 kPa. The air permeability value of the separator 16 may be from about 3500 cm³/cm²·min @ 1 kPa to about 3800 cm³/cm²·min @ 1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14. The plating material may also exhibit an ability to suppress gas formation when the current collector 20 is contacted by the anode 14.

The seal 22 may be prepared by injection molding a polymer, such as polyamide, polypropylene, polyetherurethane, or the like; a polymer composite; and any combination thereof into a shape with predetermined dimensions. The seal 22 may be made from, for example, Nylon 6,6; Nylon 6,10; Nylon 6,12; Nylon 11; polypropylene; polyetherurethane; co-polymers; composites; and any combination thereof. Exemplary injection molding methods include both the cold runner method and the hot runner method. The seal 22 may contain other known functional materials such as a plasticizer, a crystalline nucleating agent, an antioxidant, a mold release agent, a lubricant, and an antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel or tin-plated steel. The end cap 24 may be electrically connected to the current collector 20. The end cap 24 may, for example, make electrical connection to the current collector 20 by being welded to the current collector 20. The end cap 24 may also include one or more apertures, such as holes, for venting any gas pressure due to electrolyte leakage or venting of the battery due to buildup of excessive internal pressure. The current collector 20, the seal 22, and the end cap 24 may be collectively referred to as the end cap assembly.

The battery 10 including a cathode 12 including non-stoichiometric beta-delithiated layered nickel oxide may have an open-circuit voltage (OCV) that is measured in volts. The battery 10 may have an OCV from about 1.7 V to about 1.8 V. The battery 10 may have an OCV, for example, of about 1.76 V.

Batteries including non-stoichiometric beta-delithiated layered nickel oxide electrochemically active cathode materials of the present invention may have improved discharge performance for low, mid, and high drain discharge rates than, for example, conventional alkaline batteries. Batteries including non-stoichiometric beta-delithiated layered nickel oxide electrochemically active cathode materials of the present invention may have higher open circuit voltages than, for example, conventional alkaline batteries.

Experimental Testing

Elemental Analysis via ICP-AES of Beta-Delithiated Layered Nickel Oxide Electrochemically Active Material Elemental analysis via ICP-AES is completed on a sample of non-stoichiometric beta-delithiated layered nickel oxide electrochemically active material to determine the elemental composition of the sample material. ICP-AES analysis is completed using a HORIBA Scientific Ultima 2 ICP spectrometer. ICP-AES analysis is completed by placing a sample solution within the spectrometer. The sample solution is prepared in a manner that is dependent upon the element(s) that are desired to be analyzed.

For elemental analysis, a first solution is formed by adding 0.15 g of the sample materials to 2 ml deionized water (DI) and 5 ml concentrated hydrochloric acid (HCl). The sample is swirled gently to mix the contents and then placed into a CEM Discover SP-D automated microwave digestion system. While the sample is stirring the microwave system is ramped to 180° C. in 3 minutes and then held at 180° C. for 4 minutes. The system is set to a maximum power of 300 W and a pressure set point of 225 PSI. A second solution is formed by adding the first solution to a 100 ml volumetric flask and diluting to the mark with DI water. The second solution is used for elemental analysis of lithium (Li), potassium (K), and rubidium (Rb) using the ICP-AES spectrometer. A third solution is formed by transferring one mL of the second solution into a 50 mL centrifuge tube; adding about 2.5 mL of concentrated HCl to the centrifuge tube; adding distilled water to the centrifuge tube so that the total weight of the sixth solution is 50 grams; and mixing the components of the centrifuge tube. The third solution is used for elemental analysis of nickel (Ni) using the ICP-AES spectrometer.

ICP-AES analysis of the non-stoichiometric beta-delithiated layered nickel oxide electrochemically active material is performed at various wavelengths specific to potassium (K), lithium (Li), nickel (Ni), and rubidium (Rb). For example, the wavelength ($\lambda$) for analysis of potassium (K) within a non-stoichiometric beta-delithiated layered nickel oxide may be set at about 766 nm. For example, the wavelength ($\lambda$) for analysis of lithium (Li) within a non-stoichiometric beta-delithiated layered nickel oxide may be set at about 610 nm. For example, the wavelength ($\lambda$) for analysis of nickel (Ni) within a non-stoichiometric beta-delithiated layered nickel oxide may be set at about 231 nm. For example, the wavelength ($\lambda$) for analysis of rubidium (Rb) within a non-stoichiometric beta-delithiated layered nickel oxide may be set at about 780 nm.

Table 1 below includes the elemental analysis via ICP-AES results for various samples of non-stoichiometric beta-delithiated layered nickel oxide electrochemically active material and gamma-nickel oxyhydroxide materials prepared by following the synthetic methods described in Arai et al. (Electrochimica Acta, 50 (2005) 1821-1828; Solid State Ionics, 80 (1995) 261-269). The weight percent of lithium (Li), nickel (Ni), and potassium (K) within the sample material is reported. The elemental analysis via ICP-AES data is used to determine the chemical compositions of the non-stoichiometric beta-delithiated layered nickel oxide samples and gamma-nickel oxyhydroxide materials prepared by following the synthetic methods described in Arai et al. (Electrochimica Acta, 50 (2005) 1821-1828; Solid State Ionics, 80 (1995) 261-269). The elemental analysis via ICP-AES is also used to confirm the non-stoichiometry and the presence of excess nickel within the non-stoichiometric beta-delithiated layered nickel oxide composition.

Water Content via Thermogravimetric Analysis (TGA) of Beta-Delithiated Layered Nickel Oxide Electrochemically Active Material Water content via TGA is completed on a sample of non-stoichiometric beta-delithiated layered nickel oxide electrochemically active material to determine the absorbed/adsorbed water, the crystalline water, and total water content within the sample material. TGA analysis is completed using the TA Instruments Q5000 analyzer.

TGA analysis is conducted by placing about 34 mg of sample onto the TGA sample holder. The sample material is heated at a rate of 5° C./min to a temperature of about 800° C. The heating of the sample occurs in the presence of nitrogen that is flowing at a rate of, for example, about 25 mL/min. The sample weight is measured as a function of time and temperature.

Table 1 also includes the water content measured via TGA for the non-stoichiometric beta-delithiated layered nickel oxide samples. The water content that is measured via TGA is used to determine the structural lattice water present in the chemical compositions of the non-stoichiometric beta-delithiated layered nickel oxide electrochemically active material. The water content measured via TGA can be used to determine the water physically adsorbed on the surface of the non-stoichiometric beta-delithiated layered nickel oxide particles.

TABLE 1

ICP-AES and TGA data for Non-Stoichiometric Beta-Delithiated Nickel Oxide Electrochemically Active Material and Gamma-Nickel Oxyhydroxide.

| FEATURE | Lithium (weight percent) | Nickel (weight percent) | Potassium (weight percent) | Crystalline $H_2O$ (weight percent) |
|---|---|---|---|---|
| ICP-AES | | | | |
| β-Delithiated Layered Nickel Oxide ($Li_{0.07}K_{0.13}Ni_{1.11}O_2 \cdot 0.63H_2O$) | 0.49% | 65.2% | 5.2% | 10% |
| β-Delithiated Layered Nickel Oxide ($Li_{0.05}K_{0.12}Ni_{1.04}O_2 \cdot 0.58 H_2O$) | 0.37% | 61.0% | 4.69% | 9.6% |
| β-Delithiated Layered Nickel Oxide ($Li_{0.19}K_{0.08}Ni_{1.02}O_2 \cdot 0.0.41H_2O$) | 0.83% | 59.8% | 3.06% | 7.1% |
| β-Delithiated Layered Nickel Oxide ($Li_{0.07}K_{0.06}Ni_{1.08}O_2 \cdot 0.29H_2O$) | 0.71% | 62.3% | 3.54% | 7.4% |
| β-Delithiated Layered Nickel Oxide ($Li_{0.07}K_{0.06}Ni_{1.08}O_2 \cdot 0.29H_2O$) | 0.66% | 64.6% | 2.31% | 5.0% |
| β-Delithiated Layered Nickel Oxide ($Li_{0.13}K_{0.11}Ni_{1.01}O_2 \cdot 0.53H_2O$) | 0.90% | 58.8% | 4.38% | 9.0% |
| γ-Nickel Oxyhydroxide ($Li_{0.10}K_{0.14}Ni_{0.90}O_2 \cdot xH_2O$) | 0.69% | 53.1% | 5.46% | Not Available |
| γ-Nickel Oxyhydroxide ($Li_{0.05}K_{0.14}Ni_{0.93}O_2 \cdot xH_2O$) | 0.35% | 54.9% | 5.46% | Not Available |

Powder X-Ray Diffraction Analyses

Powder X-ray diffraction (XRD) analysis is performed on a crystalline powder sample using a Bruker D-8 Advance X-ray diffractometer to determine the characteristic XRD diffraction pattern of the crystalline powder sample. XRD diffraction patterns of various samples of non-stoichiometric beta-delithiated layered nickel oxide as well as several comparative samples were obtained using Cu Kα radiation and a Sol-X detector (Baltic Scientific Instruments, Riga, Latvia). About one gram to about two grams of the sample material was placed within the Bruker sample holder. The sample holder including the sample material was then placed into the rotating sample stage of the X-ray diffractometer and the sample material was then irradiated by the CuKα X-ray source of the diffractometer. The XRD patterns were then collected using a 0.02° step size at 2 seconds/step from 10°2θ to 80°2θ using the Diffrac-plus software supplied by Bruker Corporation. Analysis and refinement of the diffraction patterns was performed using EVA and Topas data analysis software packages (Bruker AXS Inc.). The XRD patterns of the samples were compared to reference XRD patterns in the PDF-4+ database (International Centre for Diffraction Data, ICDD).

Structure Model for Beta-Delithiated Layered Nickel Oxide

DIFFaX computer simulations were used to reproduce experimentally measured X-ray diffraction patterns in order to elucidate the nature of the highly faulted layered structure of non-stoichiometric beta-delithiated layered nickel oxide. The DIFFaX program assumes the formalism that a crystalline solid can be built up by stacking layers of planes of atoms (ions) and calculates the X-ray diffraction pattern by integrating the diffracted intensities versus 2θ diffraction angle layer by layer for a given stacking sequence. In the case of non-stoichiometric beta-delithiated layered nickel oxide, the $NiO_2$ layers were built up using the same atomic positions as those used to simulate the ideal layered R-3m structure. The $NiO_2$ layers were then stacked along the c-axis direction with a translation (i.e., stacking) vector applied to introduce the particular type of stacking faults present, for example, O3, O1, and P3. The simulations introduced a random distribution of stacking faults. In order to introduce specific stacking faults, different stacking vectors were employed. The probability with which each stacking vector is applied can be varied until a satisfactory match of the calculated X-ray diffraction pattern to the experimental X-ray diffraction pattern is achieved. The fit of the simulation was assessed by Rietveld analysis of the simulated pattern versus the experimental pattern.

Through analysis of X-ray diffraction patterns, lattice imaging by scanning transmission electron microscopy (STEM), and electron diffraction (CBED) patterns, a detailed structure model was developed describing the characteristic faulting structure for non-stoichiometric beta-delithiated layered nickel oxide. The characteristic diffraction peak intensities, peak positions, and peak widths of the experimental X-ray diffraction pattern were simulated by introducing an increasing level of O3-type layer stacking faults into an ordered O1-type lattice using the DIFFaX software. The presence of a small proportion of O3-type layer stacking faults also can be related to the existence of certain structural (i.e., growth) defects as well as nickel(II) ions located in lithium ion sites in the interlayer. Without intending to be bound by theory, it is believed that during the formation of non-stoichiometric beta-delithiated layered nickel oxide, the migration of $Ni^{2+}$ ions into interlayer sites previously occupied by lithium ions in a non-stoichiometric alpha-delithiated layered nickel oxide can cause an ordering of the metal-containing layers in the O1-type stacking sequence such that Ni-containing layers cluster along the c-axis. This can result in an ordered O1-type lattice, wherein the oxygen atoms are cubic close packed and include a superimposed ordering of the metal-containing layers in which two Ni— containing layers separate each Li-containing layer such that ordering along the c-axis is, for example, —O—Li—O—Ni—O—Ni—O—Li—O—, rather than —O—Li—O—Ni—Li—O—Ni—O— which is the metal-containing layer ordering in the case of the alpha-delithiated layered nickel oxide. The formation of adjacent Ni-containing layers is both systematic and periodic. Further, it is believed that another type of planar fault may result from intercalation of alkali ions and water molecules during KOH treatment, the fault having a layer structure closely related to that of gamma-nickel oxyhydroxide. Gamma-nickel oxyhydroxide is reported to have an oxygen stacking sequence of AB BC CA (i.e., P3-type stacking). Introduction of this P3-type stacking fault into the ordered O1 lattice was confirmed by the appearance of a broad, low intensity diffraction peak at about 10.8° to about 12.0° 2θ in the simulated X-ray diffraction pattern that closely matched a corresponding peak in the experimental X-ray diffraction pattern.

The best fits obtained for the X-ray diffraction patterns simulated by the DIFFaX program versus the experimental X-ray diffraction patterns for non-stoichiometric beta-delithiated layered nickel oxide samples prepared from various non-stoichiometric lithium nickelate precursors for the above structure model are summarized in Table 2.

TABLE 2

Fractions for O1-type packing and stacking faults for non-stoichiometric beta-delithiated layered nickel oxide

| Sample No. | Layer Fractions for Stacking Types | | |
|---|---|---|---|
|  | O1 | O3 | γ-NiOOH |
| 4 | 0.86 | 0.09 | 0.05 |
| 34 | 0.88 | 0.08 | 0.04 |
| 43 | 0.91 | 0.06 | 0.04 |
| 44 | 0.61 | 0.37 | 0.02 |
| 46 | 0.94 | 0.02 | 0.04 |

The layer fraction for the O3-type layer stacking fault ranged from about 0.02 to about 0.40, the layer fraction for the gamma-NiOOH-like fault ranged from about 0.02 to about 0.05, and the layer fraction for the dominant ordered O1 stacking sequence ranged from about 0.60 to about 0.95. This structure model successfully accounted for the non-uniform abnormal diffraction peak broadening in the characteristic X-ray powder diffraction pattern of the beta-delithiated layered nickel oxide samples prepared from non-stoichiometric alpha-delithiated layered nickel oxide by treatment in potassium hydroxide solution.

Gas Evolution by Alpha- and Beta-Delithiated Layered Nickel Oxide

The rate of oxygen evolution by non-stoichiometric beta-delithiated layered nickel oxide in contact with alkaline electrolyte solution was determined using a gas evolution rate analyzer and compared to that for the corresponding non-stoichiometric alpha-delithiated layered nickel oxide precursor. Total gas pressure as a function of storage time at 40° C. is shown in Table 3. The rate of oxygen evolution for non-stoichiometric beta-delithiated layered nickel oxide is substantially less than that for alpha-delithiated layered nickel oxide. Specifically, the total oxygen pressure for a sample of non-stoichiometric beta-delithiated layered nickel oxide after 80 hours storage at 40° C. was less than 50% of that for the corresponding non-stoichiometric alpha-delithiated layered nickel oxide precursor.

TABLE 3

Gas evolution by non-stoichiometric alpha- and beta-layered delithiated nickel oxide

| Sample Stoichiometry | Gas Pressure (mBars) | | |
|---|---|---|---|
|  | 20 hrs | 40 hrs | 80 hrs |
| Alpha: $Li_{0.08}Ni_{1.20}O_2$ | 137 | 150 | 160 |
| Beta: $Li_{0.07}K_{0.13}Ni_{1.11}O_2 \cdot 0.63H_2O$ | 65 | 69 | 74 |

Thus, Table 3 shows advantageously decreased oxygen gas evolution for a non-stoichiometric beta-delithiated layered nickel oxide according to the invention, compared to the corresponding non-stoichiometric alpha-delithiated layered nickel oxide precursor.

Assembly of AA Alkaline Primary Batteries

A conventional AA alkaline battery, referred to as Battery A in Table 5 below, is assembled. Battery A includes an anode, a cathode, a separator, and an aqueous alkaline electrolyte within a cylindrical housing. The anode includes an anode slurry containing 4.27 grams of metallic zinc powder; 1.78 grams of an alkaline KOH electrolyte with about 31% KOH by weight and 2.0% ZnO by weight dissolved in water; 0.026 grams of polyacrylic acid gellant; and 0.023 grams of corrosion inhibitor. The cathode includes a blend of electrolytic manganese dioxide (EMD), graphite, and potassium hydroxide aqueous electrolyte solution. The cathode includes a loading of 10.87 grams of EMD, 0.46 grams of Timrex MX-15 graphite, 0.12 grams of Timrex BNB-90 expanded graphite (Imerys Graphite and Carbon, Bodio, Switzerland), and 0.52 grams of alkaline KOH electrolyte solution. A separator is interposed between the anode and cathode. The separator is wetted with a pre-shot of about 1.33 grams of an alkaline KOH electrolyte solution with about 31% KOH by weight dissolved in deionized water. The anode, cathode, and separator are inserted into a cylindrical housing. The housing is then hermetically sealed to complete the battery assembly process. Battery A then undergoes aging for four days at 20° C. and performance testing as is described below.

An experimental AA battery, referred to as Battery B in Table 4 below, is assembled. Battery B includes an anode, a cathode, a separator, and an electrolyte within a cylindrical housing. The anode includes an anode slurry containing 5.17 grams of metallic zinc powder; 2.17 grams of an alkaline KOH electrolyte with about 27% KOH by weight and 1.7% ZnO by weight dissolved in deionized water; 0.038 grams of polyacrylic acid gellant; and 0.01 grams of corrosion inhibitor. The cathode includes a blend of non-stoichiometric beta-delithiated layered nickel oxide, graphite, and potassium hydroxide aqueous electrolyte solution. The cathode includes a loading of 9.54 grams of a beta-delithiated layered nickel oxide, 0.78 grams Timrex MX-15 graphite (Imerys Graphite and Carbon, Bodio, Switzerland), and 0.52 grams of KOH electrolyte solution. A separator is interposed between the anode and cathode. The separator is wetted with a pre-shot of about 1.00 gram of an alkaline KOH electrolyte solution with about 5.5% KOH by weight dissolved in deionized water. The anode, cathode, and separator are inserted into a cylindrical housing. The housing is then hermetically sealed to complete the battery assembly process.

Battery B then undergoes aging for four days at 20° C. and performance testing as is described below.

TABLE 4

The design features of AA Battery A and Battery B.

| FEATURE | BATTERY A | BATTERY B |
|---|---|---|
| Anode | | |
| Zinc Amount | 4.27 g/0.0652 mol | 5.17 g/0.0791 mol |
| Gelling Agent Weight | 0.026 g | 0.038 g |
| Corrosion Inhibitor Weight | 0.023 g | 0.010 g |
| Cathode | | |
| Active Amount | 10.87 g/0.125 mol (EMD) | 9.54 g/0.0905 mol ($Li_{0.07}K_{0.13}Ni_{1.11}O_2 \cdot 0.63H_2O$) |
| Graphite Weight | 0.58 g | 0.78 g |
| Complete Cell | | |
| Total KOH Weight | 1.168 g | 0.76 g |
| Total Water Weight | 2.593 g | 2.870 g |
| Average KOH Concentration in Electrolyte, by weight | 21% | 31% |
| Total ZnO Weight | 0.041 g | 0.063 g |

Performance Testing of Assembled AA Alkaline Primary Batteries

Prior to performance testing, the battery is aged for four days at about 20° C. After four days of aging, the Open Circuit Voltage (OCV) of the battery is measured. The OCV of the battery is measured by placing, for example, a voltmeter across the positive and negative terminals of the battery. The measured open circuit voltage (V) of the battery is reported. The OCV test does not consume any capacity from the battery.

After four days of aging, the Short Circuit Current (SCC) of the battery is measured. The SCC test protocol includes drawing a constant current of six amperes (Amps) for a period of 0.1 seconds from the battery. The voltage of the battery is measured while under the drain of six Amps and is reported. The battery would have a measured voltage of zero (0) volts if the battery is completely short circuited. The current at which the battery would achieve short circuit condition is calculated by extrapolating a line connecting the coordinates of the measured OCV and the measured voltage under drain to the intercept of the x-axis on an x,y plot of current versus voltage. The measured OCV has an (x,y) coordinate of (0 Amp, measured OCV). The measured voltage under drain has an (x,y) coordinate of (6 Amps, measured Load Voltage). The SSC test does not consume a significant amount of the total capacity from the battery due to the extremely short duration of the test. The SSC is calculated by the following formula:

$$SSC\ (Amps) = [(OCV \cdot 6\ Amp)/(OCV - Load\ Voltage)]$$

Performance testing includes a discharge performance test that may be referred to as 30 Milliampere (30 mA) Continuous Discharge Test. The 30 mA Continuous Discharge Test protocol includes discharging the battery at a constant current drain of 30 mA until a cutoff voltage of 0.9 volts is reached. The measured capacity of the battery discharged to the cutoff voltage is referred to as the Total Capacity of the battery. The Total Capacity of the battery is reported typically in both ampere hours (Ah) and Watt hours (Wh). The 30 mA Continuous Discharge Test is considered to be a low drain continuous discharge test for a conventional alkaline AA battery.

Performance testing includes a discharge performance test at a high rate continuous discharge regime referred to as 1 Watt (1 W) Continuous Discharge Test. The 1 W Continuous Discharge Test protocol includes discharging the battery at a constant power drain of 1 watt until a cutoff voltage of 0.9 volts is reached. The measured capacity of the battery discharged to the cutoff voltage is typically reported in both ampere hours (Ah) and Watt hours (Wh). The 1 W Continuous Discharge Test is considered to be a high drain discharge test for a conventional alkaline AA battery.

Performance testing includes a discharge performance test at a medium rate intermittent discharge regime referred to as the 250 Milliwatt (250 mW) Intermittent Discharge Test. The 250 mW Intermittent Discharge Test protocol includes discharging the battery at a constant power drain of 250 mW for a period of one hour. The discharge is then stopped and the battery is allowed to rest for a period of seven hours. The battery is then subjected to additional cycles of discharge and rest until a cutoff voltage of 0.9 volts is reached. The measured capacity of the battery is typically reported in both ampere hours (Ah) and Watt hours (Wh). The 250 mW Intermittent Discharge Test is considered to be a medium drain intermittent discharge test for a conventional alkaline AA battery.

Performance testing includes a discharge performance test designed to simulate use in digital cameras that may be referred to as the Digital Camera Test (Digicam). The Digital Camera Test is a pulse test protocol that includes discharging the battery with high and medium power pulsed discharge cycles. Each discharge cycle consists of a combination of two discharge regimes including a 1.5 Watt high power pulse for a period of 2 seconds followed immediately by a 650 mW medium power pulse for 28 seconds. This combination of discharge regimes is repeated ten times (i.e., 5 minutes total) and then the battery is allowed to rest for a period of fifty-five minutes. The combination of high and medium power discharge pulses and rest period (i.e., 1 hour/cycle) is repeated until a cutoff voltage of 1.05 volts is reached. The number of cycles required to reach the cutoff voltage is reported as "pulses" or "pictures". The number of pulses reported consists of the total number of 1.5 Watt high power pulses, which corresponds to the total number of discharge cycles. The Digicam Discharge Test is considered to be a high rate intermittent discharge test for a conventional AA battery.

Performance Testing Results

Battery A and Battery B were both subjected to OCV, SSC, 30 mA Continuous, 1 W Continuous, 250 mW Intermittent, and Digicam performance testing. Table 5 below summarizes the performance testing results. The % Difference column of Table 5 includes the percentage difference in performance for Battery B with respect to Battery A. Battery B that includes non-stoichiometric beta-delithiated layered nickel oxide as the electrochemically active cathode material provides improved overall performance when compared with Battery A, a typical commercial, conventional, alkaline AA battery. The OCV of Battery B is higher when compared with that of Battery A. The higher OCV of Battery B is indicative of a higher total energy as compared to Battery A. The OCV of Battery B is not too high so that the likelihood of damage when Battery B is incorporated in an electrical device is relatively low. The SSC of Battery B is significantly higher than that of Battery A. The higher SSC of Battery B is indicative of a greater ability to deliver higher discharge currents than Battery A. The amount of current, in Ah, that is delivered by Battery B under all discharge tests, aside from the 1 W Continuous test, is greater than Battery A. The amount of energy, in Wh, that is delivered by Battery B under all discharge tests is greater than Battery A. In addition, the number of pulses that are delivered by Battery B under the Digicam test is much greater than Battery A. The results indicate that Battery B is, overall, better performing than Battery A for low rate, medium rate, and high rate discharge testing regimes.

TABLE 5

Performance testing results and comparisons for Battery A and Battery B.

| TEST PROTOCOL | BATTERY A | BATTERY B | % DIFFERENCE |
|---|---|---|---|
| OCV (V) | 1.62 | 1.76 | +9% |
| SSC (Amps) | 19.0 | 23.4 | +23% |
| 30 mA Continuous (Ah/Wh) | 2.86/3.62 | 3.42/5.30 | +20%/+46% |
| 1 W Continuous (Ah/Wh) | 0.90/1.02 | 0.86/1.20 | −4%/+18% |
| 250 mW Intermittent (Ah/Wh) | 2.25/2.73 | 2.97/3.25 | +32%/+19% |
| Digicam (pulses) | 108 | 396 | +267% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A non-stoichiometric beta-delithiated layered nickel oxide comprising a layered crystal structure, the layered crystal structure characterized by a lattice comprising (a) a plurality of $NiO_2$ layers and (b) lithium ions and nickel ions located in an interlayer region between adjacent $NiO_2$ layers, wherein the lattice comprises an ordered O1-type layer stacking sequence having an O3-type layer stacking fault and a γ-NiOOH-like layer stacking fault, and the non-stoichiometric beta-delithiated layered nickel oxide has a reduced amount of lithium relative to non-stoichiometric lithium nickelate, $Li_{1-a}Ni_{1+a}O_2$, wherein $0.02 \leq a \leq 0.2$.

2. The non-stoichiometric beta-delithiated layered nickel oxide of claim 1, wherein the lattice comprises about 60 to about 95% ordered O1-type layer stacking, based on the total layers.

3. The non-stoichiometric beta-delithiated layered nickel oxide of claim 2, wherein the lattice comprises about 85 to about 95% ordered O1-type layer stacking, based on the total layers.

4. The non-stoichiometric beta-delithiated layered nickel oxide of claim 2, wherein the lattice comprises about 60 to about 85% ordered O1-type layer stacking, based on the total layers.

5. The non-stoichiometric beta-delithiated layered nickel oxide of claim 1, wherein the lattice comprises about 2 to about 5% γ-NiOOH-like layer stacking faults, based on the total layers.

6. The non-stoichiometric beta-delithiated layered nickel oxide of claim 1, wherein the lattice comprises about 2 to about 40% O3-type layer stacking faults, based on total layers.

7. The non-stoichiometric beta-delithiated layered nickel oxide of claim 6, wherein the lattice comprises about 2 to about 15% O3-type layer stacking faults, based on total layers.

8. The non-stoichiometric beta-delithiated layered nickel oxide of claim 6, wherein the lattice comprises about 15 to about 40% O3-type layer stacking faults, based on total layers.

9. The non-stoichiometric beta-delithiated layered nickel oxide of claim 1, wherein the lattice comprises about 60 to about 95% ordered O1-type layer stacking, about 2 to about 40% O3-type layer stacking faults, and about 2 to about 5% γ-NiOOH-like layer stacking faults, based on the total layers.

10. The non-stoichiometric beta-delithiated layered nickel oxide of claim 1, wherein the beta-delithiated layered nickel oxide comprises a chemical formula $Li_xA_yNi_{1+a-z}M_zO_2 \cdot nH_2O$ wherein x is from about 0.02 to about 0.20;
y is from about 0.03 to about 0.20;
a is from about 0.02 to about 0.2;
z is from about 0 to about 0.2;
n is from about 0 to about 1;
A comprises an alkali metal comprising potassium, rubidium, cesium, and any combination thereof; and
M comprises an alkaline earth metal, a transition metal, a non-transition metal, and any combination thereof.

11. The non-stoichiometric beta-delithiated layered nickel oxide of claim 10, wherein z is 0.

12. The non-stoichiometric beta-delithiated layered nickel oxide of claim 10, wherein a is between 0.02 and 0.16.

13. The non-stoichiometric beta-delithiated layered nickel oxide of claim 10, wherein x is between 0.03 and 0.12.

14. The non-stoichiometric beta-delithiated layered nickel oxide of claim 10, wherein y is between 0.08 and 0.13.

15. The non-stoichiometric beta-delithiated layered nickel oxide of claim 1, wherein the beta-delithiated layered nickel oxide has an X-ray diffraction pattern comprising a first peak from about 14.9°2θ to about 16.0°2θ; a second peak from about 21.3°2θ to about 22.7°2θ; a third peak from about 37.1°2θ to about 37.4°2θ; a fourth peak from about 43.2°2θ to about 44.0°2θ; a fifth peak from about 59.6°2θ to about 60.6°2θ; a sixth peak from about 65.4°2θ to about 65.9°2θ, a seventh peak at from about 10.8° to about 12.0°2θ, and an eight peak from about 48.1° to about 48.6°2θ.

16. The non-stoichiometric beta-delithiated layered nickel oxide of claim 1, wherein the γ-NiOOH-like layer stacking fault comprises a P3-type layer stacking sequence.

17. The non-stoichiometric beta-delithiated layered nickel oxide of claim 1, wherein the ordered O1-type layer stacking sequence comprises a superimposed ordering of the metal-containing layers wherein two $NiO_2$ layers separate each interlayer.

18. An electrochemically active cathode material comprising the non-stoichiometric beta-delithiated layered nickel oxide of claim 1.

19. A battery comprising:
- a cathode comprising a conductive additive and an electrochemically active cathode material, the electrochemically active cathode material comprising the non-stoichiometric beta-delithiated layered nickel oxide of claim 1;
- an anode comprising an electrochemically active anode material, the electrochemically
- active anode material comprising zinc, zinc alloy, and any combination thereof;
- a separator between the cathode and the anode; and
- an alkaline aqueous electrolyte.

20. The battery of claim 19, wherein the electrochemically active cathode material comprises the non-stoichiometric beta-delithiated layered nickel oxide in an amount of at least 10 wt. %, based on the total weight of the electrochemically active cathode material.

21. The battery of claim 19, wherein the electrochemically active cathode material comprises the non-stoichiometric beta-delithiated layered nickel oxide in an amount between 10 wt. % and 60 wt. %, based on the total weight of the electrochemically active cathode material.

22. The battery of claim 19, wherein the electrochemically active cathode material comprises the non-stoichiometric beta-delithiated layered nickel oxide in an amount of about 50 wt. %, based on the total weight of the electrochemically active cathode material.

23. The battery of claim 19, wherein the electrochemically active cathode material comprises the non-stoichiometric beta-delithiated layered nickel oxide in an amount of about 20 wt. %, based on the total weight of the electrochemically active cathode material.

24. The battery of claim 19, wherein the electrochemically active cathode material further comprises one or more of manganese oxide, manganese dioxide, electrolytic manganese dioxide (EMD), chemical manganese dioxide (CMD), high power electrolytic manganese dioxide (HP EMD), lambda manganese dioxide, or gamma manganese dioxide.

25. The battery of claim 20, wherein the balance of the electrochemically active cathode material comprises one or more of manganese oxide, manganese dioxide, electrolytic manganese dioxide (EMD), chemical manganese dioxide (CMD), high power electrolytic manganese dioxide (HP EMD), lambda manganese dioxide, or gamma manganese dioxide.

* * * * *